(12) United States Patent
Hotelling et al.

(10) Patent No.: US 8,872,771 B2
(45) Date of Patent: Oct. 28, 2014

(54) TOUCH SENSING DEVICE HAVING CONDUCTIVE NODES

(75) Inventors: Steven Porter Hotelling, San Jose, CA (US); Stephen Paul Zadesky, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 1029 days.

(21) Appl. No.: 12/499,028

(22) Filed: Jul. 7, 2009

(65) Prior Publication Data

US 2011/0005845 A1 Jan. 13, 2011

(51) Int. Cl.
*G09G 5/00* (2006.01)
*G06F 3/041* (2006.01)
*G06F 3/045* (2006.01)
*G06F 3/044* (2006.01)

(52) U.S. Cl.
CPC .................................... *G06F 3/044* (2013.01)
USPC ........ 345/168; 345/173; 345/174; 178/18.01; 178/18.06; 73/774

(58) Field of Classification Search
None
See application file for complete search history.

(56) References Cited

U.S. PATENT DOCUMENTS

| | | |
|---|---|---|
| 1,061,578 A | 5/1913 | Wischhusen et al. |
| 2,063,276 A | 12/1936 | Thomas |
| 2,798,907 A | 7/1957 | Schneider |
| 2,903,229 A | 9/1959 | Landge |
| 2,945,111 A | 7/1960 | McCormick |
| 3,005,055 A | 10/1961 | Mattke |
| 3,965,399 A | 6/1976 | Walker et al. |
| 3,996,441 A | 12/1976 | Ohashi |
| 4,029,915 A | 6/1977 | Ojima |
| 4,103,252 A | 7/1978 | Bobick |
| 4,110,749 A | 8/1978 | Janko et al. |
| 4,115,670 A | 9/1978 | Chandler |
| 4,121,204 A | 10/1978 | Welch et al. |
| 4,129,747 A | 12/1978 | Pepper |
| 4,158,216 A | 6/1979 | Bigelow |
| 4,242,676 A | 12/1980 | Piguet et al. |
| 4,246,452 A | 1/1981 | Chandler |
| 4,264,903 A | 4/1981 | Bigelow |

(Continued)

FOREIGN PATENT DOCUMENTS

| | | |
|---|---|---|
| CN | 1139235 | 1/1997 |
| CN | 1455615 | 11/2003 |

(Continued)

OTHER PUBLICATIONS

Interlink Electronics, VersaPad: Integration Guide, © 1998 (VersaPad), pp. 1-35.

(Continued)

*Primary Examiner* — Andrew L Sniezek
(74) *Attorney, Agent, or Firm* — Morrison & Foerster LLP

(57) ABSTRACT

A touch sensing device having conductive nodes is disclosed. The device can include a first structure having one or more conductive electrodes disposed on a surface opposite the structure's touchable surface and a second structure having one or more conductive nodes disposed on a surface. The two surfaces can be placed with the conductive electrodes and conductive nodes facing each other in close proximity so that the electrodes and the nodes can form capacitive elements for sensing a touch on the touchable surface. Separately disposing the conductive nodes from the touchable surface structure can make the touch sensing device thin. An example touch sensing device can be a click wheel.

23 Claims, 10 Drawing Sheets

(56) References Cited

U.S. PATENT DOCUMENTS

| | | |
|---|---|---|
| 4,266,144 A | 5/1981 | Bristol |
| 4,293,734 A | 10/1981 | Pepper, Jr. |
| D264,969 S | 6/1982 | McGourty |
| 4,338,502 A | 7/1982 | Hashimoto et al. |
| 4,380,007 A | 4/1983 | Steinegger |
| 4,380,040 A | 4/1983 | Posset |
| 4,394,649 A | 7/1983 | Suchoff et al. |
| 4,475,008 A | 10/1984 | Doi et al. |
| 4,570,149 A | 2/1986 | Thornburg et al. |
| 4,583,161 A | 4/1986 | Gunderson et al. |
| 4,587,378 A | 5/1986 | Moore |
| 4,604,786 A | 8/1986 | Howie, Jr. |
| 4,613,736 A | 9/1986 | Shichijo et al. |
| 4,644,100 A | 2/1987 | Brenner et al. |
| 4,719,524 A | 1/1988 | Morishima et al. |
| 4,734,034 A | 3/1988 | Maness et al. |
| 4,736,191 A | 4/1988 | Matzke et al. |
| 4,739,191 A | 4/1988 | Puar |
| 4,739,299 A | 4/1988 | Eventoff et al. |
| 4,752,655 A | 6/1988 | Tajiri et al. |
| 4,755,765 A | 7/1988 | Ferland |
| 4,764,717 A | 8/1988 | Tucker et al. |
| 4,771,139 A | 9/1988 | DeSmet |
| 4,798,919 A | 1/1989 | Miessler et al. |
| 4,810,992 A | 3/1989 | Eventoff |
| 4,822,957 A | 4/1989 | Talmage, Jr. et al. |
| 4,831,359 A | 5/1989 | Newell |
| 4,849,852 A | 7/1989 | Mullins |
| 4,856,993 A | 8/1989 | Maness et al. |
| 4,860,768 A | 8/1989 | Hon et al. |
| 4,866,602 A | 9/1989 | Hall |
| 4,876,524 A | 10/1989 | Jenkins |
| 4,897,511 A | 1/1990 | Itaya et al. |
| 4,914,624 A | 4/1990 | Dunthorn |
| 4,917,516 A | 4/1990 | Retter |
| 4,943,889 A | 7/1990 | Ohmatoi |
| 4,951,036 A | 8/1990 | Grueter et al. |
| 4,954,823 A | 9/1990 | Binstead |
| 4,976,435 A | 12/1990 | Shatford et al. |
| 4,990,900 A | 2/1991 | Kikuchi |
| 5,008,497 A | 4/1991 | Asher |
| 5,036,321 A | 7/1991 | Leach et al. |
| 5,053,757 A | 10/1991 | Meadows |
| 5,086,870 A | 2/1992 | Bolduc |
| 5,125,077 A | 6/1992 | Hall |
| 5,159,159 A | 10/1992 | Asher |
| 5,179,648 A | 1/1993 | Hauck |
| 5,186,646 A | 2/1993 | Pederson |
| 5,192,082 A | 3/1993 | Inoue et al. |
| 5,193,669 A | 3/1993 | Demeo et al. |
| 5,231,326 A | 7/1993 | Echols |
| 5,237,311 A | 8/1993 | Mailey et al. |
| 5,278,362 A | 1/1994 | Ohashi |
| 5,305,017 A | 4/1994 | Gerpheide |
| 5,313,027 A | 5/1994 | Inoue et al. |
| D349,280 S | 8/1994 | Kaneko |
| 5,339,213 A | 8/1994 | O'Callaghan |
| 5,367,199 A | 11/1994 | Lefkowitz et al. |
| 5,374,787 A | 12/1994 | Miller et al. |
| 5,379,057 A | 1/1995 | Clough et al. |
| 5,404,152 A | 4/1995 | Nagai |
| 5,408,621 A | 4/1995 | Ben-Arie |
| 5,414,445 A | 5/1995 | Kaneko et al. |
| 5,416,498 A | 5/1995 | Grant |
| 5,424,756 A | 6/1995 | Ho et al. |
| 5,432,531 A | 7/1995 | Calder et al. |
| 5,438,331 A | 8/1995 | Gilligan et al. |
| D362,431 S | 9/1995 | Kaneko et al. |
| 5,450,075 A | 9/1995 | Waddington |
| 5,453,761 A | 9/1995 | Tanaka |
| 5,473,343 A | 12/1995 | Kimmich et al. |
| 5,473,344 A | 12/1995 | Bacon et al. |
| 5,479,192 A | 12/1995 | Carroll, Jr. et al. |
| 5,494,157 A | 2/1996 | Golenz et al. |
| 5,495,566 A | 2/1996 | Kwatinetz |
| 5,508,703 A | 4/1996 | Okamura et al. |
| 5,508,717 A | 4/1996 | Miller |
| 5,543,588 A | 8/1996 | Bisset et al. |
| 5,543,591 A | 8/1996 | Gillespie et al. |
| 5,555,004 A | 9/1996 | Ono et al. |
| 5,559,301 A | 9/1996 | Bryan, Jr. et al. |
| 5,559,943 A | 9/1996 | Cyr et al. |
| 5,561,445 A | 10/1996 | Miwa et al. |
| 5,564,112 A | 10/1996 | Hayes et al. |
| 5,565,887 A | 10/1996 | McCambridge et al. |
| 5,578,817 A | 11/1996 | Bidiville et al. |
| 5,581,670 A | 12/1996 | Bier et al. |
| 5,585,823 A | 12/1996 | Duchon et al. |
| 5,589,856 A | 12/1996 | Stein et al. |
| 5,589,893 A | 12/1996 | Gaughan et al. |
| 5,596,347 A | 1/1997 | Robertson et al. |
| 5,596,697 A | 1/1997 | Foster et al. |
| 5,598,183 A | 1/1997 | Robertson et al. |
| 5,611,040 A | 3/1997 | Brewer et al. |
| 5,611,060 A | 3/1997 | Belfiore et al. |
| 5,613,137 A | 3/1997 | Bertram et al. |
| 5,617,114 A | 4/1997 | Bier et al. |
| 5,627,531 A | 5/1997 | Posso et al. |
| 5,632,679 A | 5/1997 | Tremmel |
| 5,640,258 A | 6/1997 | Kurashima et al. |
| 5,648,642 A | 7/1997 | Miller et al. |
| D382,550 S | 8/1997 | Kaneko et al. |
| 5,657,012 A | 8/1997 | Tait |
| 5,661,632 A | 8/1997 | Register |
| D385,542 S | 10/1997 | Kaneko et al. |
| 5,675,362 A | 10/1997 | Clough et al. |
| 5,689,285 A | 11/1997 | Asher |
| 5,721,849 A | 2/1998 | Amro |
| 5,726,687 A | 3/1998 | Belfiore et al. |
| 5,729,219 A | 3/1998 | Armstrong et al. |
| 5,730,165 A | 3/1998 | Philipp |
| 5,748,185 A | 5/1998 | Stephan et al. |
| 5,751,274 A | 5/1998 | Davis |
| 5,754,890 A | 5/1998 | Holmdahl et al. |
| 5,764,066 A | 6/1998 | Novak et al. |
| 5,777,605 A | 7/1998 | Yoshinobu et al. |
| 5,786,818 A | 7/1998 | Brewer et al. |
| 5,790,769 A | 8/1998 | Buxton et al. |
| 5,798,752 A | 8/1998 | Buxton et al. |
| 5,805,144 A | 9/1998 | Scholder et al. |
| 5,808,602 A | 9/1998 | Sellers |
| 5,812,239 A | 9/1998 | Eger |
| 5,812,498 A | 9/1998 | Terés |
| 5,815,141 A | 9/1998 | Phares |
| 5,825,351 A | 10/1998 | Tam |
| 5,825,352 A | 10/1998 | Bisset et al. |
| 5,825,353 A | 10/1998 | Will |
| 5,828,364 A | 10/1998 | Siddiqui |
| 5,838,304 A | 11/1998 | Hall |
| 5,841,078 A | 11/1998 | Miller et al. |
| 5,841,423 A | 11/1998 | Carroll, Jr. et al. |
| D402,281 S | 12/1998 | Ledbetter et al. |
| 5,850,213 A | 12/1998 | Imai et al. |
| 5,856,645 A | 1/1999 | Norton |
| 5,856,822 A | 1/1999 | Du et al. |
| 5,859,629 A | 1/1999 | Tognazzini |
| 5,861,875 A | 1/1999 | Gerpheide |
| 5,869,791 A | 2/1999 | Young |
| 5,875,311 A | 2/1999 | Bertram et al. |
| 5,883,619 A | 3/1999 | Ho et al. |
| 5,889,236 A | 3/1999 | Gillespie et al. |
| 5,889,511 A | 3/1999 | Ong et al. |
| 5,894,117 A | 4/1999 | Kamishima |
| 5,903,229 A | 5/1999 | Kishi |
| 5,907,152 A | 5/1999 | Dandiliker et al. |
| 5,907,318 A | 5/1999 | Medina |
| 5,909,211 A | 6/1999 | Combs et al. |
| 5,910,802 A | 6/1999 | Shields et al. |
| 5,914,706 A | 6/1999 | Kono |
| 5,923,388 A | 7/1999 | Kurashima et al. |
| D412,940 S | 8/1999 | Kato et al. |
| 5,933,102 A | 8/1999 | Miller et al. |
| 5,933,141 A | 8/1999 | Smith |
| 5,936,619 A | 8/1999 | Nagasaki et al. |

(56) References Cited

U.S. PATENT DOCUMENTS

| | | |
|---|---|---|
| 5,943,044 A | 8/1999 | Martinelli et al. |
| 5,953,000 A | 9/1999 | Weirich |
| 5,956,019 A | 9/1999 | Bang et al. |
| 5,959,610 A | 9/1999 | Silfvast |
| 5,959,611 A | 9/1999 | Smailagic et al. |
| 5,964,661 A | 10/1999 | Dodge |
| 5,973,668 A | 10/1999 | Watanabe |
| 6,000,000 A | 12/1999 | Hawkins et al. |
| 6,002,093 A | 12/1999 | Hrehor et al. |
| 6,002,389 A | 12/1999 | Kasser et al. |
| 6,005,299 A | 12/1999 | Hengst |
| 6,025,832 A | 2/2000 | Sudo et al. |
| 6,031,518 A | 2/2000 | Adams et al. |
| 6,034,672 A | 3/2000 | Gaultier et al. |
| 6,057,829 A | 5/2000 | Silfvast |
| 6,075,533 A | 6/2000 | Chang |
| 6,084,574 A | 7/2000 | Bidiville |
| D430,169 S | 8/2000 | Scibora |
| 6,097,372 A | 8/2000 | Suzuki |
| 6,104,790 A | 8/2000 | Narayanaswami |
| 6,122,526 A | 9/2000 | Parulski et al. |
| 6,124,587 A | 9/2000 | Bidiville et al. |
| 6,128,006 A | 10/2000 | Rosenberg et al. |
| 6,131,048 A | 10/2000 | Sudo et al. |
| 6,141,068 A | 10/2000 | Iijima |
| 6,147,856 A | 11/2000 | Karidis |
| 6,163,312 A | 12/2000 | Furuya |
| 6,166,721 A | 12/2000 | Kuroiwa et al. |
| 6,179,496 B1 | 1/2001 | Chou |
| 6,181,322 B1 | 1/2001 | Nanavati |
| D437,860 S | 2/2001 | Suzuki et al. |
| 6,188,391 B1 | 2/2001 | Seely et al. |
| 6,188,393 B1 | 2/2001 | Shu |
| 6,191,774 B1 | 2/2001 | Schena et al. |
| 6,198,054 B1 | 3/2001 | Janniere |
| 6,198,473 B1 | 3/2001 | Armstrong |
| 6,211,861 B1 | 4/2001 | Rosenberg et al. |
| 6,219,038 B1 | 4/2001 | Cho |
| 6,222,528 B1 | 4/2001 | Gerpheide et al. |
| D442,592 S | 5/2001 | Ledbetter et al. |
| 6,225,976 B1 | 5/2001 | Yates et al. |
| 6,225,980 B1 | 5/2001 | Weiss et al. |
| 6,226,534 B1 | 5/2001 | Aizawa |
| 6,227,966 B1 | 5/2001 | Yokoi |
| D443,616 S | 6/2001 | Fisher et al. |
| 6,243,078 B1 | 6/2001 | Rosenberg |
| 6,243,080 B1 | 6/2001 | Molne |
| 6,243,646 B1 | 6/2001 | Ozaki et al. |
| 6,248,017 B1 | 6/2001 | Roach |
| 6,254,477 B1 | 7/2001 | Sasaki et al. |
| 6,256,011 B1 | 7/2001 | Culver |
| 6,259,491 B1 | 7/2001 | Ekedahl et al. |
| 6,262,717 B1 | 7/2001 | Donohue et al. |
| 6,262,785 B1 | 7/2001 | Kim |
| 6,266,050 B1 | 7/2001 | Oh et al. |
| 6,285,211 B1 | 9/2001 | Sample et al. |
| D448,810 S | 10/2001 | Goto |
| 6,297,795 B1 | 10/2001 | Kato et al. |
| 6,297,811 B1 | 10/2001 | Kent et al. |
| 6,300,946 B1 | 10/2001 | Lincke et al. |
| 6,307,539 B2 | 10/2001 | Suzuki |
| D450,713 S | 11/2001 | Masamitsu et al. |
| 6,314,483 B1 | 11/2001 | Goto et al. |
| 6,321,441 B1 | 11/2001 | Davidson et al. |
| 6,323,845 B1 | 11/2001 | Robbins |
| D452,250 S | 12/2001 | Chan |
| 6,340,800 B1 | 1/2002 | Zhai et al. |
| D454,568 S | 3/2002 | Andre et al. |
| 6,357,887 B1 | 3/2002 | Novak |
| D455,793 S | 4/2002 | Lin |
| 6,373,265 B1 | 4/2002 | Morimoto et al. |
| 6,373,470 B1 | 4/2002 | Andre et al. |
| 6,377,530 B1 | 4/2002 | Burrows |
| 6,396,523 B1 | 5/2002 | Segal et al. |
| 6,424,338 B1 | 7/2002 | Anderson |
| 6,429,846 B2 | 8/2002 | Rosenberg et al. |
| 6,429,852 B1 | 8/2002 | Adams et al. |
| 6,452,514 B1 | 9/2002 | Philipp |
| 6,465,271 B1 | 10/2002 | Ko et al. |
| 6,473,069 B1 | 10/2002 | Gerphelde |
| 6,492,602 B2 | 12/2002 | Asai et al. |
| 6,492,979 B1 | 12/2002 | Kent et al. |
| 6,496,181 B1 | 12/2002 | Bomer et al. |
| 6,497,412 B1 | 12/2002 | Bramm |
| D468,365 S | 1/2003 | Bransky et al. |
| D469,109 S | 1/2003 | Andre et al. |
| D472,245 S | 3/2003 | Andre et al. |
| 6,530,283 B2 * | 3/2003 | Okada et al. ............... 73/780 |
| 6,546,231 B1 | 4/2003 | Someya et al. |
| 6,563,487 B2 | 5/2003 | Martin et al. |
| 6,587,091 B2 | 7/2003 | Serpa |
| 6,606,244 B1 | 8/2003 | Liu et al. |
| 6,618,909 B1 | 9/2003 | Yang |
| 6,636,197 B1 | 10/2003 | Goldenberg et al. |
| 6,639,584 B1 | 10/2003 | Li |
| 6,640,250 B1 | 10/2003 | Chang et al. |
| 6,650,975 B2 | 11/2003 | Ruffner |
| D483,809 S | 12/2003 | Lim |
| 6,658,773 B2 | 12/2003 | Rohne et al. |
| 6,664,951 B1 | 12/2003 | Fujii et al. |
| 6,677,927 B1 | 1/2004 | Bruck et al. |
| 6,678,891 B1 | 1/2004 | Wilcox et al. |
| 6,686,904 B1 | 2/2004 | Sherman et al. |
| 6,686,906 B2 | 2/2004 | Salminen et al. |
| 6,703,550 B2 | 3/2004 | Chu |
| 6,724,817 B1 | 4/2004 | Simpson et al. |
| 6,727,889 B2 | 4/2004 | Shaw |
| D489,731 S | 5/2004 | Huang |
| 6,738,045 B2 | 5/2004 | Hinckley et al. |
| 6,750,803 B2 | 6/2004 | Yates et al. |
| 6,781,576 B2 | 8/2004 | Tamura |
| 6,784,384 B2 | 8/2004 | Park et al. |
| 6,788,288 B2 | 9/2004 | Ano |
| 6,791,533 B2 | 9/2004 | Su |
| 6,795,057 B2 | 9/2004 | Gordon |
| D497,618 S | 10/2004 | Andre et al. |
| 6,810,271 B1 | 10/2004 | Wood et al. |
| 6,822,640 B2 | 11/2004 | Derocher |
| 6,834,975 B2 | 12/2004 | Chu-Chia et al. |
| 6,844,872 B1 | 1/2005 | Farag et al. |
| 6,855,899 B2 | 2/2005 | Sotome |
| 6,865,718 B2 | 3/2005 | Montalcini |
| 6,886,842 B2 | 5/2005 | Vey et al. |
| 6,894,916 B2 | 5/2005 | Reohr et al. |
| D506,476 S | 6/2005 | Andre et al. |
| 6,922,189 B2 | 7/2005 | Fujiyoshi |
| 6,930,494 B2 | 8/2005 | Tesdahl et al. |
| 6,958,614 B2 * | 10/2005 | Morimoto ............... 324/661 |
| 6,977,808 B2 | 12/2005 | Lam et al. |
| 6,978,127 B1 | 12/2005 | Bulthuis et al. |
| 6,985,137 B2 | 1/2006 | Kaikuranta |
| 7,006,077 B1 | 2/2006 | Uusimäki |
| 7,019,225 B2 | 3/2006 | Matsumoto et al. |
| 7,046,230 B2 | 5/2006 | Zadesky et al. |
| 7,050,292 B2 | 5/2006 | Shimura et al. |
| 7,069,044 B2 | 6/2006 | Okada et al. |
| 7,078,633 B2 | 7/2006 | Ihalainen |
| 7,084,856 B2 | 8/2006 | Huppi |
| 7,113,196 B2 | 9/2006 | Kerr |
| 7,117,136 B1 | 10/2006 | Rosedale |
| 7,119,792 B1 | 10/2006 | Andre et al. |
| 7,215,319 B2 | 5/2007 | Kamijo et al. |
| 7,233,318 B1 | 6/2007 | Farag et al. |
| 7,236,154 B1 | 6/2007 | Kerr et al. |
| 7,236,159 B1 | 6/2007 | Siversson |
| 7,253,643 B1 | 8/2007 | Seguine |
| 7,279,647 B2 | 10/2007 | Philipp |
| 7,288,732 B2 | 10/2007 | Hashida |
| 7,297,883 B2 | 11/2007 | Rochon et al. |
| 7,310,089 B2 | 12/2007 | Baker et al. |
| 7,312,785 B2 | 12/2007 | Tsuk et al. |
| 7,321,103 B2 | 1/2008 | Nakanishi et al. |
| 7,333,092 B2 | 2/2008 | Zadesky et al. |
| 7,348,898 B2 | 3/2008 | Ono |

(56) References Cited

U.S. PATENT DOCUMENTS

| | | |
|---|---|---|
| 7,382,139 B2 | 6/2008 | Mackey |
| 7,394,038 B2 | 7/2008 | Chang |
| 7,395,081 B2 | 7/2008 | Bonnelykke Kristensen et al. |
| 7,397,467 B2 | 7/2008 | Park et al. |
| 7,439,963 B2 | 10/2008 | Geaghan et al. |
| 7,466,307 B2 | 12/2008 | Trent et al. |
| 7,479,949 B2 | 1/2009 | Jobs et al. |
| 7,486,323 B2 | 2/2009 | Lee et al. |
| 7,502,016 B2 | 3/2009 | Trent, Jr. et al. |
| 7,503,193 B2 | 3/2009 | Schoene et al. |
| 7,593,782 B2 | 9/2009 | Jobs et al. |
| 7,645,955 B2 | 1/2010 | Huang et al. |
| 7,671,837 B2 | 3/2010 | Forsblad et al. |
| 7,708,051 B2 | 5/2010 | Katsumi et al. |
| 7,772,507 B2 | 8/2010 | Orr et al. |
| 2001/0011991 A1 | 8/2001 | Wang et al. |
| 2001/0011993 A1 | 8/2001 | Saarinen |
| 2001/0033270 A1 | 10/2001 | Osawa et al. |
| 2001/0043545 A1 | 11/2001 | Aratani |
| 2001/0050673 A1 | 12/2001 | Davenport |
| 2001/0051046 A1 | 12/2001 | Watanabe et al. |
| 2002/0000978 A1 | 1/2002 | Gerpheide |
| 2002/0011993 A1 | 1/2002 | Lui et al. |
| 2002/0027547 A1 | 3/2002 | Kamijo |
| 2002/0030665 A1 | 3/2002 | Ano |
| 2002/0033848 A1 | 3/2002 | Sciammarella et al. |
| 2002/0039493 A1 | 4/2002 | Tanaka |
| 2002/0045960 A1 | 4/2002 | Phillips et al. |
| 2002/0071550 A1 | 6/2002 | Pletikosa |
| 2002/0089545 A1 | 7/2002 | Montalcini |
| 2002/0103796 A1 | 8/2002 | Hartley |
| 2002/0118131 A1 | 8/2002 | Yates et al. |
| 2002/0118169 A1 | 8/2002 | Hinckley et al. |
| 2002/0145594 A1 | 10/2002 | Derocher |
| 2002/0154090 A1 | 10/2002 | Lin |
| 2002/0158844 A1 | 10/2002 | McLoone et al. |
| 2002/0164156 A1 | 11/2002 | Bilbrey |
| 2002/0168947 A1 | 11/2002 | Lemley |
| 2002/0180701 A1 | 12/2002 | Hayama et al. |
| 2002/0196239 A1 | 12/2002 | Lee |
| 2003/0002246 A1 | 1/2003 | Kerr |
| 2003/0025679 A1 | 2/2003 | Taylor et al. |
| 2003/0028346 A1 | 2/2003 | Sinclair et al. |
| 2003/0043121 A1 | 3/2003 | Chen |
| 2003/0043174 A1 | 3/2003 | Hinckley et al. |
| 2003/0050092 A1 | 3/2003 | Yun |
| 2003/0076301 A1 | 4/2003 | Tsuk et al. |
| 2003/0076303 A1 | 4/2003 | Huppi |
| 2003/0076306 A1 | 4/2003 | Zadesky et al. |
| 2003/0091377 A1 | 5/2003 | Hsu et al. |
| 2003/0095095 A1 | 5/2003 | Pihlaja |
| 2003/0095096 A1 | 5/2003 | Robbin et al. |
| 2003/0098851 A1 | 5/2003 | Brink |
| 2003/0103043 A1 | 6/2003 | Mulligan et al. |
| 2003/0122792 A1 | 7/2003 | Yamamoto et al. |
| 2003/0135292 A1 | 7/2003 | Husgafvel et al. |
| 2003/0142081 A1 | 7/2003 | Iizuka et al. |
| 2003/0184517 A1 | 10/2003 | Senzui et al. |
| 2003/0197740 A1 | 10/2003 | Reponen |
| 2003/0206202 A1 | 11/2003 | Moriya |
| 2003/0210537 A1 | 11/2003 | Engelmann |
| 2003/0224831 A1 | 12/2003 | Engstrom et al. |
| 2004/0027341 A1 | 2/2004 | Derocher |
| 2004/0074756 A1 | 4/2004 | Kawakami et al. |
| 2004/0080682 A1 | 4/2004 | Dalton |
| 2004/0109357 A1 | 6/2004 | Cernea et al. |
| 2004/0150619 A1 | 8/2004 | Baudisch et al. |
| 2004/0156192 A1 | 8/2004 | Kerr et al. |
| 2004/0178997 A1 | 9/2004 | Gillespie et al. |
| 2004/0200699 A1 | 10/2004 | Matsumoto et al. |
| 2004/0215986 A1 | 10/2004 | Shakkarwar |
| 2004/0224638 A1 | 11/2004 | Fadell et al. |
| 2004/0239622 A1 | 12/2004 | Proctor et al. |
| 2004/0252109 A1 | 12/2004 | Trent, Jr. et al. |
| 2004/0252867 A1 | 12/2004 | Lan et al. |
| 2004/0253989 A1 | 12/2004 | Tupler et al. |
| 2004/0263388 A1 | 12/2004 | Krumm et al. |
| 2004/0267874 A1 | 12/2004 | Westberg et al. |
| 2005/0012644 A1 | 1/2005 | Hurst et al. |
| 2005/0017957 A1 | 1/2005 | Yi |
| 2005/0024341 A1 | 2/2005 | Gillespie et al. |
| 2005/0030048 A1 | 2/2005 | Bolender |
| 2005/0052425 A1 | 3/2005 | Zadesky et al. |
| 2005/0052426 A1 | 3/2005 | Hagermoser et al. |
| 2005/0052429 A1 | 3/2005 | Philipp |
| 2005/0068304 A1 | 3/2005 | Lewis et al. |
| 2005/0083299 A1 | 4/2005 | Nagasaka |
| 2005/0083307 A1 | 4/2005 | Aufderheide |
| 2005/0090288 A1 | 4/2005 | Stohr et al. |
| 2005/0104867 A1 | 5/2005 | Westerman et al. |
| 2005/0110768 A1 | 5/2005 | Marriott et al. |
| 2005/0129199 A1 | 6/2005 | Abe |
| 2005/0139460 A1 | 6/2005 | Hosaka |
| 2005/0140657 A1 | 6/2005 | Park et al. |
| 2005/0143124 A1 | 6/2005 | Kennedy et al. |
| 2005/0156881 A1 | 7/2005 | Trent et al. |
| 2005/0162402 A1 | 7/2005 | Watanachote |
| 2005/0204309 A1 | 9/2005 | Szeto |
| 2005/0237308 A1 | 10/2005 | Autio et al. |
| 2005/0259081 A1* | 11/2005 | Sato ............................. 345/169 |
| 2006/0026521 A1 | 2/2006 | Hotelling et al. |
| 2006/0032680 A1 | 2/2006 | Elias et al. |
| 2006/0038791 A1 | 2/2006 | Mackey |
| 2006/0095848 A1 | 5/2006 | Naik |
| 2006/0097991 A1 | 5/2006 | Hotelling et al. |
| 2006/0131156 A1 | 6/2006 | Voelckers |
| 2006/0143574 A1 | 6/2006 | Ito et al. |
| 2006/0174568 A1 | 8/2006 | Kinoshita et al. |
| 2006/0181517 A1 | 8/2006 | Zadesky et al. |
| 2006/0197750 A1 | 9/2006 | Kerr et al. |
| 2006/0232557 A1 | 10/2006 | Fallot-Burghardt |
| 2006/0236262 A1 | 10/2006 | Bathiche et al. |
| 2006/0250377 A1 | 11/2006 | Zadesky et al. |
| 2006/0274042 A1 | 12/2006 | Krah et al. |
| 2006/0274905 A1 | 12/2006 | Lindahl et al. |
| 2006/0279896 A1 | 12/2006 | Bruwer |
| 2006/0284836 A1 | 12/2006 | Philipp |
| 2007/0013671 A1 | 1/2007 | Zadesky et al. |
| 2007/0018970 A1 | 1/2007 | Tabasso et al. |
| 2007/0052044 A1 | 3/2007 | Forsblad et al. |
| 2007/0052691 A1 | 3/2007 | Zadesky et al. |
| 2007/0080936 A1 | 4/2007 | Tsuk et al. |
| 2007/0080938 A1 | 4/2007 | Robbin et al. |
| 2007/0080952 A1 | 4/2007 | Lynch et al. |
| 2007/0083822 A1 | 4/2007 | Robbin et al. |
| 2007/0085841 A1 | 4/2007 | Tsuk et al. |
| 2007/0097086 A1 | 5/2007 | Battles et al. |
| 2007/0120834 A1 | 5/2007 | Boillot |
| 2007/0126696 A1 | 6/2007 | Boillot |
| 2007/0152975 A1 | 7/2007 | Ogihara |
| 2007/0152977 A1 | 7/2007 | Ng et al. |
| 2007/0152983 A1 | 7/2007 | McKillop et al. |
| 2007/0155434 A1 | 7/2007 | Jobs et al. |
| 2007/0157089 A1 | 7/2007 | Van Os et al. |
| 2007/0242057 A1 | 10/2007 | Zadesky et al. |
| 2007/0247421 A1 | 10/2007 | Orsley et al. |
| 2007/0247443 A1 | 10/2007 | Philipp |
| 2007/0271516 A1 | 11/2007 | Carmichael |
| 2007/0273671 A1 | 11/2007 | Zadesky et al. |
| 2007/0276525 A1 | 11/2007 | Zadesky et al. |
| 2007/0279394 A1 | 12/2007 | Lampell |
| 2007/0285404 A1 | 12/2007 | Rimon et al. |
| 2007/0290990 A1 | 12/2007 | Robbin et al. |
| 2007/0291016 A1 | 12/2007 | Philipp |
| 2007/0296709 A1 | 12/2007 | GuangHai |
| 2008/0006453 A1 | 1/2008 | Hotelling et al. |
| 2008/0006454 A1 | 1/2008 | Hotelling |
| 2008/0007533 A1 | 1/2008 | Hotelling et al. |
| 2008/0007539 A1 | 1/2008 | Hotelling et al. |
| 2008/0012837 A1 | 1/2008 | Marriott et al. |
| 2008/0018615 A1 | 1/2008 | Zadesky et al. |
| 2008/0018616 A1 | 1/2008 | Lampell et al. |
| 2008/0018617 A1 | 1/2008 | Ng et al. |
| 2008/0036473 A1 | 2/2008 | Jansson |

(56) References Cited

U.S. PATENT DOCUMENTS

| | | |
|---|---|---|
| 2008/0036734 A1 | 2/2008 | Forsblad et al. |
| 2008/0060925 A1 | 3/2008 | Weber et al. |
| 2008/0069412 A1 | 3/2008 | Champagne et al. |
| 2008/0079699 A1 | 4/2008 | Mackey |
| 2008/0087476 A1 | 4/2008 | Prest et al. |
| 2008/0088582 A1 | 4/2008 | Prest |
| 2008/0088596 A1 | 4/2008 | Prest |
| 2008/0088597 A1 | 4/2008 | Prest |
| 2008/0088600 A1 | 4/2008 | Prest |
| 2008/0094352 A1 | 4/2008 | Tsuk et al. |
| 2008/0098330 A1 | 4/2008 | Tsuk et al. |
| 2008/0110739 A1 | 5/2008 | Peng et al. |
| 2008/0111795 A1 | 5/2008 | Bollinger |
| 2008/0143681 A1 | 6/2008 | XiaoPing |
| 2008/0165158 A1 | 7/2008 | Hotelling et al. |
| 2008/0196945 A1 | 8/2008 | Konstas |
| 2008/0202824 A1 | 8/2008 | Philipp et al. |
| 2008/0209442 A1 | 8/2008 | Setlur et al. |
| 2008/0264767 A1 | 10/2008 | Chen et al. |
| 2008/0280651 A1 | 11/2008 | Duarte |
| 2008/0284742 A1 | 11/2008 | Prest |
| 2008/0293274 A1 | 11/2008 | Milan |
| 2009/0021267 A1 | 1/2009 | Golovchenko et al. |
| 2009/0026558 A1 | 1/2009 | Bauer et al. |
| 2009/0033635 A1 | 2/2009 | Wai |
| 2009/0036176 A1 | 2/2009 | Ure |
| 2009/0058687 A1 | 3/2009 | Rothkopf et al. |
| 2009/0058801 A1 | 3/2009 | Bull |
| 2009/0058802 A1 | 3/2009 | Orsley et al. |
| 2009/0073130 A1 | 3/2009 | Weber et al. |
| 2009/0078551 A1 | 3/2009 | Kang |
| 2009/0109181 A1 | 4/2009 | Hui et al. |
| 2009/0141046 A1 | 6/2009 | Rathnam et al. |
| 2009/0160771 A1 | 6/2009 | Hinckley et al. |
| 2009/0179854 A1 | 7/2009 | Weber et al. |
| 2009/0197059 A1 | 8/2009 | Weber et al. |
| 2009/0229892 A1 | 9/2009 | Fisher et al. |
| 2009/0273573 A1 | 11/2009 | Hotelling |
| 2010/0013775 A1* | 1/2010 | Son ............................. 345/168 |
| 2010/0058251 A1 | 3/2010 | Rottler et al. |
| 2010/0060568 A1 | 3/2010 | Fisher et al. |
| 2010/0073319 A1 | 3/2010 | Lyon et al. |
| 2010/0149127 A1 | 6/2010 | Fisher et al. |
| 2010/0289759 A1 | 11/2010 | Fisher et al. |
| 2010/0313409 A1 | 12/2010 | Weber et al. |

FOREIGN PATENT DOCUMENTS

| | | |
|---|---|---|
| CN | 1499356 | 5/2004 |
| CN | 1659506 | 8/2005 |
| DE | 3615742 | 11/1987 |
| DE | 19722636 | 12/1998 |
| DE | 10022537 | 11/2000 |
| DE | 20019074 U1 | 2/2001 |
| DE | 10 2004 043 663 | 4/2006 |
| EP | 0178157 | 4/1986 |
| EP | 0419145 A1 | 3/1991 |
| EP | 0 498 540 | 8/1992 |
| EP | 0 521 683 | 1/1993 |
| EP | 0 674 288 | 9/1995 |
| EP | 0 731 407 | 9/1996 |
| EP | 0 551 778 B1 | 1/1997 |
| EP | 0 880 091 A2 | 11/1998 |
| EP | 1 026 713 | 8/2000 |
| EP | 1 081 922 A2 | 3/2001 |
| EP | 1 098 241 A2 | 5/2001 |
| EP | 1 133 057 | 9/2001 |
| EP | 1 162 826 A2 | 12/2001 |
| EP | 1 168 396 | 1/2002 |
| EP | 1 205 836 A2 | 5/2002 |
| EP | 1 244 053 | 9/2002 |
| EP | 1 251 455 A2 | 10/2002 |
| EP | 1263193 | 12/2002 |
| EP | 1347481 | 9/2003 |
| EP | 1376326 | 1/2004 |
| EP | 1 467 392 | 10/2004 |
| EP | 1 482 401 | 12/2004 |
| EP | 1 496 467 | 1/2005 |
| EP | 1 517 228 | 3/2005 |
| EP | 1 542 437 A2 | 6/2005 |
| EP | 1 589 407 | 10/2005 |
| EP | 1 784 058 A2 | 5/2007 |
| EP | 1 841 188 | 10/2007 |
| EP | 1850218 | 10/2007 |
| EP | 1 876 711 | 1/2008 |
| FR | 2 686 440 | 7/1993 |
| GB | 2015167 | 9/1979 |
| GB | 2072389 | 9/1981 |
| GB | 2315186 | 1/1998 |
| GB | 2333215 | 7/1999 |
| GB | 2391060 | 1/2004 |
| GB | 2 402 105 | 12/2004 |
| JP | 57-95722 | 6/1982 |
| JP | 57-97626 | 6/1982 |
| JP | 61-117619 | 6/1986 |
| JP | 61-124009 | 6/1986 |
| JP | 63-20411 | 1/1988 |
| JP | 63-106826 | 5/1988 |
| JP | 63-181022 | 7/1988 |
| JP | 63-298518 | 12/1988 |
| JP | 03-57617 | 6/1991 |
| JP | 3-192418 | 8/1991 |
| JP | 04-32920 | 2/1992 |
| JP | 4-205408 | 7/1992 |
| JP | 5-041135 | 2/1993 |
| JP | 5-080938 | 4/1993 |
| JP | 5-101741 | 4/1993 |
| JP | 5-36623 | 5/1993 |
| JP | 5-189110 | 7/1993 |
| JP | 5-205565 | 8/1993 |
| JP | 5-211021 | 8/1993 |
| JP | 5-217464 | 8/1993 |
| JP | 5-233141 | 9/1993 |
| JP | 5-262276 | 10/1993 |
| JP | 5-265656 | 10/1993 |
| JP | 5-274956 | 10/1993 |
| JP | 5-289117 | 11/1993 |
| JP | 5-298955 | 11/1993 |
| JP | 5-325723 | 12/1993 |
| JP | 6-20570 | 1/1994 |
| JP | 6-084428 | 3/1994 |
| JP | 6-089636 | 3/1994 |
| JP | 6-96639 | 4/1994 |
| JP | 6-111695 | 4/1994 |
| JP | 6-139879 | 5/1994 |
| JP | 6-187078 | 7/1994 |
| JP | 6-208433 | 7/1994 |
| JP | 6-267382 | 9/1994 |
| JP | 6-283993 | 10/1994 |
| JP | 6-333459 | 12/1994 |
| JP | 7-107574 | 4/1995 |
| JP | 7-41882 | 7/1995 |
| JP | 7-201249 | 8/1995 |
| JP | 7-201256 | 8/1995 |
| JP | 7-253838 | 10/1995 |
| JP | 7-261899 | 10/1995 |
| JP | 7-261922 | 10/1995 |
| JP | 7-296670 | 11/1995 |
| JP | 7-319001 | 12/1995 |
| JP | 8-016292 | 1/1996 |
| JP | 8-115158 | 5/1996 |
| JP | 8-203387 | 8/1996 |
| JP | 8-293226 | 11/1996 |
| JP | 8-298045 | 11/1996 |
| JP | 8-299541 | 11/1996 |
| JP | 8-316664 | 11/1996 |
| JP | 9-044289 | 2/1997 |
| JP | 9-069023 | 3/1997 |
| JP | 9-128148 | 5/1997 |
| JP | 9-134248 | 5/1997 |
| JP | 9-218747 | 8/1997 |
| JP | 9-230993 | 9/1997 |
| JP | 9-231858 | 9/1997 |

(56) References Cited

FOREIGN PATENT DOCUMENTS

| | | |
|---|---|---|
| JP | 9-233161 | 9/1997 |
| JP | 9-251347 | 9/1997 |
| JP | 9-258895 | 10/1997 |
| JP | 9-288926 | 11/1997 |
| JP | 9-512979 | 12/1997 |
| JP | 10-63467 | 3/1998 |
| JP | 10-74127 | 3/1998 |
| JP | 10-074429 | 3/1998 |
| JP | 10-198507 | 7/1998 |
| JP | 10-227878 | 8/1998 |
| JP | 10-240693 | 9/1998 |
| JP | 10-320322 | 12/1998 |
| JP | 10-326149 | 12/1998 |
| JP | 11-24834 | 1/1999 |
| JP | 11-184607 | 7/1999 |
| JP | 11-194863 | 7/1999 |
| JP | 11-194872 | 7/1999 |
| JP | 11-194882 | 7/1999 |
| JP | 11-194883 | 7/1999 |
| JP | 11-194891 | 7/1999 |
| JP | 11-195353 | 7/1999 |
| JP | 11-203045 | 7/1999 |
| JP | 11-212725 | 8/1999 |
| JP | 11-272378 | 10/1999 |
| JP | 11-338628 | 12/1999 |
| JP | 2000-200147 | 7/2000 |
| JP | 2000-215549 | 8/2000 |
| JP | 2000-267777 | 9/2000 |
| JP | 2000-267786 | 9/2000 |
| JP | 2000-267797 | 9/2000 |
| JP | 2000-353045 | 12/2000 |
| JP | 2001-11769 | 1/2001 |
| JP | 2001-22508 | 1/2001 |
| JP | 2001-184158 | 7/2001 |
| JP | 3085481 | 2/2002 |
| JP | 2002-215311 | 8/2002 |
| JP | 2003-015796 | 1/2003 |
| JP | 2003-060754 | 2/2003 |
| JP | 2003-099198 | 4/2003 |
| JP | 2003-150303 | 5/2003 |
| JP | 2003-517674 | 5/2003 |
| JP | 2003-280799 | 10/2003 |
| JP | 2003-280807 | 10/2003 |
| JP | 2004-362097 | 12/2004 |
| JP | 2005-251218 | 9/2005 |
| JP | 2005-285140 | 10/2005 |
| JP | 2005-293606 | 10/2005 |
| JP | 2006-004453 | 1/2006 |
| JP | 2006-178962 | 7/2006 |
| JP | 3852854 | 12/2006 |
| JP | 2007-123473 | 5/2007 |
| KR | 1998-71394 | 10/1998 |
| KR | 1999-50198 | 7/1999 |
| KR | 2000-0008579 | 2/2000 |
| KR | 2001-0052016 | 6/2001 |
| KR | 2001-108361 | 12/2001 |
| KR | 2002-65059 | 8/2002 |
| KR | 10-2006-0021678 | 3/2006 |
| TW | 431607 | 4/2001 |
| TW | 00470193 | 12/2001 |
| TW | 547716 | 8/2003 |
| TW | I220491 | 8/2004 |
| WO | WO-94/17494 | 8/1994 |
| WO | WO-95/00897 A1 | 1/1995 |
| WO | WO-96/27968 | 9/1996 |
| WO | WO 98/14863 | 4/1998 |
| WO | WO-99/49443 | 9/1999 |
| WO | WO-00/79772 | 12/2000 |
| WO | WO-01/02949 | 1/2001 |
| WO | WO-01/44912 | 6/2001 |
| WO | WO-02/08881 | 1/2002 |
| WO | WO-03/044645 | 5/2003 |
| WO | WO-03/044956 | 5/2003 |
| WO | WO-03/025960 | 9/2003 |
| WO | WO-03/088176 | 10/2003 |
| WO | WO-03/090008 | 10/2003 |
| WO | WO-2004/001573 | 12/2003 |
| WO | WO-2004/040606 | 5/2004 |
| WO | WO-2004/091956 | 10/2004 |
| WO | WO-2005/055620 | 6/2005 |
| WO | WO-2005/076117 | 8/2005 |
| WO | WO-2005/114369 | 12/2005 |
| WO | WO-2005/124526 | 12/2005 |
| WO | WO-2006/020305 | 2/2006 |
| WO | WO-2006/021211 A2 | 3/2006 |
| WO | WO-2006/037545 | 4/2006 |
| WO | WO 2006/104745 | 10/2006 |
| WO | WO-2006/135127 | 12/2006 |
| WO | WO-2007/025858 | 3/2007 |
| WO | WO-2007/078477 | 7/2007 |
| WO | WO-2007/084467 | 7/2007 |
| WO | WO-2007/089766 | 8/2007 |
| WO | WO-2008/007372 | 1/2008 |
| WO | WO-2008/045414 | 4/2008 |
| WO | WO-2008/045833 | 4/2008 |

OTHER PUBLICATIONS

Letter re: Bang & Olufsen a/s by David Safran, Nixon Peabody, LLP, May 21, 2004, with BeoCom 6000 Sales Training Brochure, 7 pages.

Kobayashi et al. (1994) "Development of the Touch Switches with the Click Response," Koukuu Denshi Gihou No. 17, pp. 44-48 (published by the Japan Aviation Electronics Industry, Ltd.).

Photographs of Innovation 2000 Best of Show Award Presented at the 2000 Int'l CES Innovations Design & Engineering Showcase, Jan. 6, 2000, 1 page.

SanDisk Sansa Connect User Guide, 2007; 29 pages.

"About Quicktip®" www.logicad3d.com/docs/qt.html, downloaded Apr. 8, 2002.

"Alps Electric Ships GlidePoint Keyboard for the Macintosh; Includes a GlidePoint Touchpad, Erase-Eaze Backspace Key and Contoured Wrist Rest," Business Wire (Jul. 1, 1996).

"Alps Electric introduces the GlidePoint Wave Keyboard; combines a gently curved design with Alps' advanced GlidePoint Technology," Business Wire (Oct. 21, 1996).

"Apple Presents iPod: Ultra-Portable MP3 Music Player Puts 1,000 Songs in Your Pocket," retreived from http://www.apple.com/pr/library/2001/oct/23ipod.html on Oct. 23, 2001.

"Apple Unveils Optical Mouse and New Pro Keyboard," Press Release, Jul. 19, 2000.

"APS show guide to exhibitors," Physics Today 49(3) (Mar. 1996).

"Atari VCS/2600 Peripherals," www.classicgaming.com/gamingmuseum/2006p.html, downloaded Feb. 28, 2007, pp. 1-15.

"Der Klangmeister," Connect Magazine, Aug. 1998.

"Design News literature plus," Design News 51(24) (Dec. 18, 1995).

"Neuros MP3 Digital Audio Computer," www.neurosaudio.com, downloaded Apr. 9, 2003.

"OEM Touchpad Modules" website www.glidepoint.com/sales/modules.index.shtml, downloaded Feb. 13, 2002.

"Product Overview—ErgoCommander®," www.logicad3d.com/products/ErgoCommander.htm, downloaded Apr. 8, 2002.

"Product Overview—SpaceMouse® Classic," www.logicad3d.com/products/Classic.htm, downloaded Apr. 8, 2002.

"System Service and Troubleshooting Manual," www.dsplib.com/intv/Master, downloaded Dec. 11, 2002.

"Synaptics Tough Pad Interfacing Guide," Second Edition, Mar. 25, 1998, Synaptics, Inc., San Jose, CA, pp. 1-90.

"Triax Custom Controllers due; Video Game Controllers," HFD—The Weekly Home Furnishing Newspaper 67(1) (Jan. 4, 1993).

Ahl, David, "Controller Update," Creative Computing Vo. 9, No. 12, Dec. 1983.

Ahmad, "A Usable Real-Time 3D Hand Tracker," Proceedings of the 28th Asilomar Conference on Signals, Systems and Computers—Part 2 (of 2) vol. 2 (Oct. 1994).

Baig, E.C., "Your PC Just Might Need a Mouse," U.S. News & World Report 108(22) (Jun. 4, 1990).

Bang & Olufsen Telecom a/s, "BeoCom 6000 User Guide 2000."

Bartimo, Jim, "The Portables: Travelling Quickly," Computerworld (Nov. 14, 1983).

BeoCom 6000, Sales Training Brochure, date unknown.

(56) References Cited

OTHER PUBLICATIONS

Bray, "Phosphors help switch on xenon," Physics in Action, pp. 1-3, Apr. 1999.
Brink et al., "Pumped-up portables," U.S. News & World Report 116(21) (May 30, 1994).
Brown et al., "Windows on Tablets as a Means of Achieving Virtual Input Devices," Human-Computer Interaction—Interact '90 (1990).
Buxton et al., "Issues and Techniques in Touch-Sensitive Tablet Input," Computer Graphics 19(3), Proceedings of SIGGRAPH '85 (1985).
Chapweske, Adam "PS/2 Mouse/Keyboard Protocol," 1999, http://panda.cs.ndsu.nodak.edu/~achapwes/PICmicro/PS2/ps2.htm.
Chen et al., "A Study in Interactive 3-D Rotation Using 2-D Control Devices," Computer Graphics 22(4) (Aug. 1988).
Chinese Office Action issue Dec. 29, 2006, directed to CN Application No. 200510103886.3, 25 pages.
De Meyer, Kevin, "Crystal Optical Mouse," Feb. 14, 2002, Heatseekerz, Web Article 19.
Evans et al., "Tablet-based Valuators that Provide One, Two, or Three Degrees of Freedom," Computer Grahics 15(3) (Aug. 1981).
EVB ELEKTRONIK "TSOP6238 IR Receiver Modules for Infrared Remote Control Systems" dated Jan. 2004 1 page.
Fiore, "Zen Touchpad," Cornell University, May 2000.
Gadgetboy, "Point and click with the latest mice," CNET Asia Product Review, www.asia.cnet.com/reviews...are/gadgetboy/0,39001770,380235900,00.htm, downloaded Dec. 5, 2001.
Gfroerer, "Photoluminescence in Analysis of Surfaces and Interfaces," Encyclopedia of Analytical Chemistry, pp. 1-23, Copyright John Wiley & Sons Ltd, Chichester, 2000.
Jesitus, John, "Broken promies?", Industry Week/IW 246(20) (Nov. 3, 1997).
Kobayashi (1996) "Design of Dynamic Soundscape: Mapping Time to Space for Audio Browsing with Simultaneous Listening," Thesis submitted to Program in Media Arts and Sciences at the Massachusetts Institute of Technology, (58 pages).
Kobayashi et al. (1997) "Dynamic Soundscape: Mapping Time to Space for Audio Browsing," Computer Human Interaction: 16 pages.
Kobayashi et al. "Development of the Touch Switches with the Click Response," Koukuu Denshi Gihou No. 17, pp. 44-48 (Mar. 1994) (published by the Japan Aviation Electronics Industry, Ltd.).
Letter re: Bang & Olufsen a/s by David Safran, Nixon Peabody, LLP May 21, 2004.
Luna Technologies International, Inc., Luna Photoluminescent Safety Products, "Photoluminescence—What is Photoluminescence?" from website at http://www.lunaplast.com/photoluminescence.com on Dec. 27, 2005.
"Manufactures," Laser Focus World, Buyers Guide '96, 31(12) (Dec. 1995).
Mims, Forrest M., III, "A Few Quick Pointers; Mouses, Touch Screens, Touch Pads, Light Pads, and the Like Can Make System Easier to Use," Computers & Electronics (22) (May 1984).
Nass, Richard, "Touchpad input device goes digital to give portable systems a desktop 'mouse-like' feel," Electronic Design 44(18) (Sep. 3, 1996).
"National Design Engineering Show," Design News 52(5) (Mar. 4, 1996).
Perenson, Melissa, "New & Improved: Touchpad Redux," PC Magazine (Sep. 10, 1996).
Petersen, Marty, "Koala Pad Touch Tablet & Micro Illustrator Software," InfoWorld (Oct. 10, 1983).
Petruzzellis, "Force-Sensing Resistors," Electronics Now 64(3) (Mar. 1993).
Photographs of Innovation 2000 Best of Show Award Presented at the 2000 Int'l CES Innovations 2000 Design & Engineering Showcase, 1 page.
"Preview of exhibitor booths at the Philadelphia show," Air Conditioning, Heating & News 200(2) (Jan. 13, 1997).
"Product news," Design News 53(9) (May 5, 1997).
"Product news," Design News 53(11) (Jun. 9, 1997).
Sony presents "Choice Without Compromise" at IBC '97 M2 Presswire (Jul. 24, 1997).
Spiwak, Marc, "A Great New Wireless Keyboard," Popular Electronics 14(12) (Dec. 1997).
Spiwak, Marc, "A Pair of Unusual Controllers," Popular Electronics 14(4) (Apr. 1997).
Soderholm, Lars G., "Sensing Systems for 'Touch and Feel'" Design News (May 8, 1989): pp. 72-76.
Sylvania, "Intellvision™ Intelligent Television Master Component Service Manual," pp. 1, 2 and 8, 1979.
Tessler, Franklin, "Point Pad," Macworld 12(10) (Oct. 1995).
Tessler, Franklin, "Touchpads," Macworld 13(2) (Feb. 1996).
Tessler, Franklin, "Smart Input: How to Chose from the New Generation of Innovative Input Devices," Macworld 13(5) (May 1996).
"Touchpad," Notebook PC Manual, ACER Information Co. Ltd., Feb. 16, 2005, pp. 11-12.
Translation of Trekstor's Defense Statement to the District Court Mannheim of May 23, 2008; 37 pages.
"Diamond Multimedia Announces Rio PMP300 Portable MP3 Music Player," located at http://news.harmony-central.com/Newp/1998/Rio-PMP300.html visited on May 5, 2008. (4 pages).
Robbin, U.S. Appl. No. 60/346,237 entitled, "Method and System for List Scrolling," filed Oct. 22, 2001; 12 pages.
Zadesky et al., U.S. Appl. No. 60/359,551 entitled "Touchpad for Handheld Device," filed Feb. 25, 2002; 34 pages.
Grignon et al., U.S. Appl. No. 60/755,656, filed Dec. 30, 2005, entitled "Touch Pad with Feedback"; 109 pages.
Elias et al., U.S. Appl. No. 60/522,107, filed Aug. 16, 2004, entitled, "A Method for Increasing the Spatial Resolution of Touch Sensitive Devices"; 15 pages.
Hotelling, U.S. Appl. No. 60/658,777 titled "Multi-Functional Handheld Device," filed Mar. 4, 2005; 68 pages.
Zadesky et al., U.S. Appl. No. 60/714,609 entitled "Scrolling Input Arrangements Using Capacitive Sensors on a Flexible Membrane," filed Sep. 6, 2005; 17 pages.
Lampell et al., U.S. Appl. No. 60/810,423, filed Jun. 2, 2006, entitled "Techniques for Interactive Input to Portable Electronic Devices"; 53 pages.
Prest et al., U.S. Appl. No. 60/850,662, filed Oct. 11, 2006, entitled, "Capacitive Scroll Wheel"; 21 pages.
Bollinger, U.S. Appl. No. 60/858,404, filed Nov. 13, 2006, entitled "Method of Capacitively Sensing Finger Position"; 13 pages.
Rothkopf, U.S. Appl. No. 60/935,854 titled "Compact Media Players," filed Sep. 4, 2007; 36 pages.
Rathnam et al., U.S. Appl. No. 60/992,056, filed Dec. 3, 2007, entitled, "Scroll Wheel Circuit Arrangements and Methods of Use Thereof"; 42 pages.
Rathnam et al., U.S. Appl. No. 61/017,436, filed Dec. 28, 2007, entitled, "Multi-Touch Scroll Wheel Circuit Arrangements and Processing Methods"; 58 pages.
Weber et al., U.S. Appl. No. 61/020,531, filed Jan. 11, 2008 entitled "Modifiable Clickwheel Text"; 11 pages.
Weber et al., U.S. Appl. No. 61/025,531, filed Feb. 1, 2008 entitled "Co-Extruded Materials and Methods"; 11 pages.
Fisher et al., U.S. Appl. No. 61/036,804, filed Mar. 14, 2008 entitled "Switchable Sensor Configurations"; 46 pages.
Robbin et al., U.S. Appl. No. 60/387,692 entitled "Method and Apparatus for Use of Rotational User Inputs," filed Jun. 10, 2002.
Robbin et al., U.S. Appl. No. 60/399,806 entitled "Graphical User Interface and Methods of Use Thereof in a Multimedia Player," filed Jul. 30, 2002.
Boling, Douglas (1993) "Programming Microsoft Windows CE.NET," p. 109.

* cited by examiner

TOUCH SENSING DEVICE HAVING CONDUCTIVE NODES

FIELD

This relates generally to touch sensing devices used in portable electronic devices and, more particularly, to a touch sensing device having conductive nodes for improved touch sensing.

BACKGROUND

There can be many factors that determine the size of compact portable electronic devices such as laptops, PDAs, media players, mobile phones, etc. In many cases, the size of the portable electronic device can be limited by the size of the operational components used therein. These components can include for example microprocessor chips, printed circuit boards, displays, memory chips, hard drives, batteries, interconnectivity circuitry, indicators, input mechanisms and the like. As such, there can be a desire to make these operational components smaller, thinner, more cost effective, and more power efficient, while maintaining or increasing their functionality to perform operations.

There exist today many styles of input mechanisms for performing operations in a portable electronic device. The operations can generally correspond to moving objects and making selections. By way of example, the input mechanisms can include buttons, keys, dials, wheels, mice, trackballs, touch pads, joy sticks, touch screens and the like. Touch devices are becoming increasingly popular in portable electronic devices because of their ease and versatility of operation, their declining price as well as their space saving ability (e.g., planarity). Touch devices can allow a user to make selections and move objects by simply moving a finger (or stylus) relative to a touch sensing surface. In general, the touch device can recognize a touch and in some circumstances the characteristics of the touch and a host controller of the portable electronic device can interpret the touch data and thereafter perform action based on the touch data.

Capacitive sensing is becoming an increasingly popular way to implement an input mechanism. However, although capacitive sensing devices can work well in portable electronic devices, improvements are still desired, such as thinner and power savings devices.

SUMMARY

This relates to a touch sensing device that can have conductive nodes for capacitive sensing. One device structure can have one or more conductive electrodes disposed on a surface opposite the structure's touchable surface. Another device structure can have one or more conductive nodes disposed on a surface. The two surfaces can be placed opposite each other in close proximity so that the conductive electrodes and the conductive nodes can form capacitive elements for sensing a touch on the touchable surface. This can advantageously provide a thinner device that can realize power savings and performance improvements.

DETAILED DESCRIPTION

In the following description of various embodiments, reference is made to the accompanying drawings which form a part hereof, and in which it is shown by way of illustration specific embodiments which can be practiced. It is to be understood that other embodiments can be used and structural changes can be made without departing from the scope of the various embodiments.

This relates to a touch sensing device that can have conductive nodes for capacitive sensing. One device structure can have one or more conductive electrodes disposed on, or similarly associated with, a surface opposite the structure's touchable surface. Another device structure can have one or more conductive nodes disposed on, or similarly associated with, a surface. The two surfaces can be placed opposite each other in close proximity so that the conductive electrodes and the conductive nodes can form capacitive elements for sensing a touch on the touchable surface.

This also relates to a touch sensing device that can have a movable cover and a stationary flexible circuit for touch and force sensing. The movable cover can have conductive electrodes on, or associated with, its surface opposite its touchable surface. The flexible circuit can have conductive nodes on, or associated with, a surface. In some embodiments, the flexible circuit's conductive nodes can include different types of nodes for touch sensing and for force sensing. The conductive electrodes can align with the conductive nodes to form capacitive sensors for sensing a touch at the cover. Some of the conductive nodes can also form force sensors for sensing a force applied at the cover.

By locating the conductive nodes associated with a structure away from, but proximate to, the structure having the touchable surface, the touch sensing device can advantageously be made thinner because it can eliminate extra space and/or components needed for configurations in which the conductive nodes reside on the touchable surface structure. This can also advantageously result in power savings and improved performance for a reduced number of components.

Example touch sensing devices can include a click wheel, a touch wheel, a touch pad, a touch screen, and the like.

Figure 1:
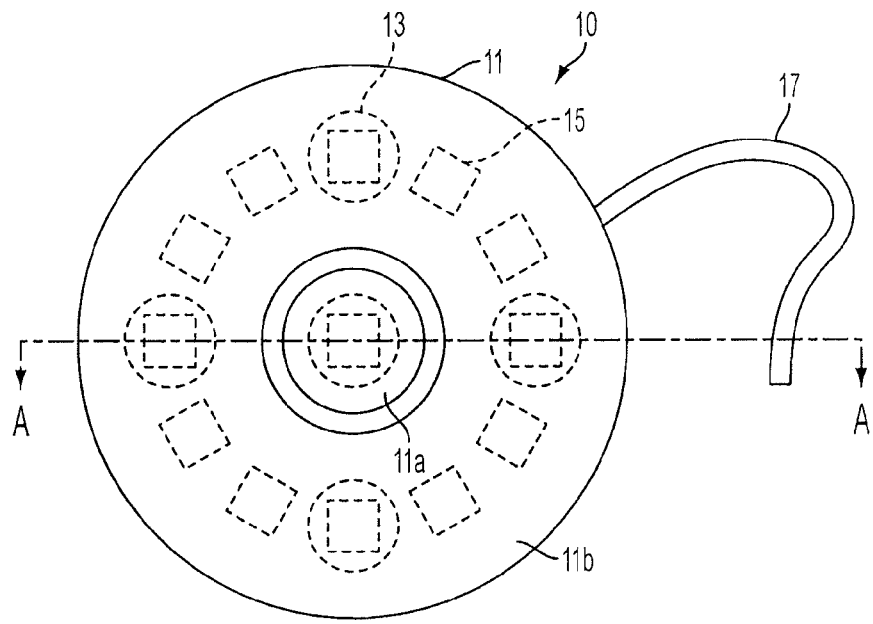
FIG. 1 illustrates a top view of an exemplary touch sensing device according to various embodiments.

FIG. 1 illustrates a top view of an exemplary touch sensing device according to various embodiments. In the example of FIG. 1, touch sensing device 10 can include touchable cover 11, which can have button 11a at the center of the cover and outer portion 11b separate from and surrounding the center button. The touchable cover 11 can be configured to receive a touch from an object and/or a force applied by the object on a surface (referred to as a touchable surface herein) of the structure. The touchable cover 11 can also be configured to cover and protect the underlying device components from dust and damage. An object's touch can be sensed by touch sensors 15 disposed under the touchable cover 11. The touch sensors 15 can be disposed under the outer portion 11b, the center button 11a, or both, to sense a touch thereat. An applied force can be sensed by force sensors 13 also disposed under the touchable cover 11. The force sensors 13 can be disposed under the outer portion 11b, the center button 11a, or both, to sense an applied force. The touch sensors 15 can be disposed at various locations under the touchable cover 11 where the object can be expected to touch. The force sensors 13 can be disposed at various locations under the touchable cover 11 where the object can be expected to apply force. In some embodiments, the force sensors and the touch sensors can be disposed at the same locations, thereby providing both touch and force sensing at those locations.

The touch sensing device 10 can also include flexible cable 17, having signal lines (not shown) so that a processor (not shown) or other suitable components can determine force applied to the force sensors and touch at the touch sensors.

In some embodiments, the touch sensors 15 can be capacitance sensors, such that a sensed change in capacitance can indicate a touch at the device 10. The capacitance can be either self capacitance or mutual capacitance. In self capacitance, each of the touch sensors 15 can be provided by an individually charged electrode. As an object approaches the touchable cover 11, the object can capacitively couple to those electrodes in close proximity of the object, thereby stealing charge away from the electrodes. The amount of charge in each of the electrodes can be measured by the touch sensing device 10 to determine the positions of objects as they touch at the touchable cover 11. In mutual capacitance, each of the touch sensors 15 can be provided by two spatially separated conductive nodes. During operation, one of the nodes can be charged and the charge can capacitively couple to the other node. As an object approaches the touchable cover 11, the object can block electric field lines formed between the two nodes, thereby stealing charge away from the nodes. The amount of charge in each of the nodes can be measured by the touch sensing device 10 to determine the positions of multiple objects when they touch the touchable cover 11.

In some embodiments, the force sensors 13 can be dome switches, such that a deformation of the switches to contact the dome of the switch with its associated conductive pad can indicate a force applied at the device 10. Each dome switch can have a dome shape, where the dome of the switch can have conductive material applied to the inside of the dome. In addition to or alternatively, the dome can be made of conductive material. Each dome switch can also have a conductive pad proximate to the dome to generate a force signal when the dome contacts the pad. The signal generated by that contact can be sensed by the touch sensing device 10 to determine which dome switch was deformed by an object's applied force and thereby the position of the object when it applied force to the touchable cover 11.

The center button 11a and the outer portion 11b can move independent of each other and can operate either together or separately, depending on the needs of the touch sensing device 10. For example, the button 11a can be actuated by an applied force, thereby causing a function associated with the button to execute, such as a selection function. When the applied force actuates the button 11a, the outer portion 11b can remain unaffected due to the separation between the button and the outer portion. Similarly, the outer portion 11b can be actuated by an applied force at a particular location of the portion, thereby causing the portion to tilt at that location and a function associated with that location to execute, such as a play/pause function, a menu function, a forward function, or a back function. In addition or alternatively, the applied force can cause the outer portion 11b to move below the plane of the cover 11 and a function associated with the location of the applied force (e.g., as sensed by the touch sensors at that location) to execute. When the applied force actuates the outer portion 11b, the button 11a can remain unaffected due to the separation between the outer portion and the button. In another example, the button 11a and the outer portion 11b can operate together. An object can touch the outer portion 11b and/or make a gesture at the outer portion, e.g., a rotational motion around the outer portion, thereby causing a function associated with the touch to execute, such as a pointing function, or a function associated with the gesture to execute, such as a scroll function. After the object completes the touch and/or gesture at the outer portion 11b, the object can touch the button 11a, thereby causing a function associated with the touch to execute, such as a selection function to select an item identified during the outer portion operation.

In some embodiments, the center button 11a can have a spring action, where the button can move below the plane of the touchable cover 11 when force is applied and can move up to the plane of the cover when the force is removed. When force is applied, the force sensor 13 disposed under the button 11a can deform to generate a force signal. In some embodiments, the outer portion 11b can have a tilt action, where the outer portion can tilt at a particular location below the original plane of the touchable cover 11 when force is applied and can move back up to the original plane of the cover when the force is removed. When force is applied, the force sensor 13 disposed at the location of the applied force can deform to generate a force signal. In some embodiments, the outer portion 11b can have a rotational motion, where the outer portion can rotate around the center button 11a in either direction when touched. When a touch or a rotational motion occurs, the touch sensors 15 disposed at the locations of the touch or rotational motion can generate touch signals. In some embodiments, the outer portion 11b can have a spring action, similar to the center button 11a, where the outer portion can move below the plane of the touchable cover 11 when force is applied and can move up to the plane of the cover when the force is removed. When force is applied, one or more of the force sensors 13 disposed under the outer portion 11b can deform to generate a force signal and one or more of the touch sensors 15 can sense the location of the applied force and generate a touch signal.

Figure 2:
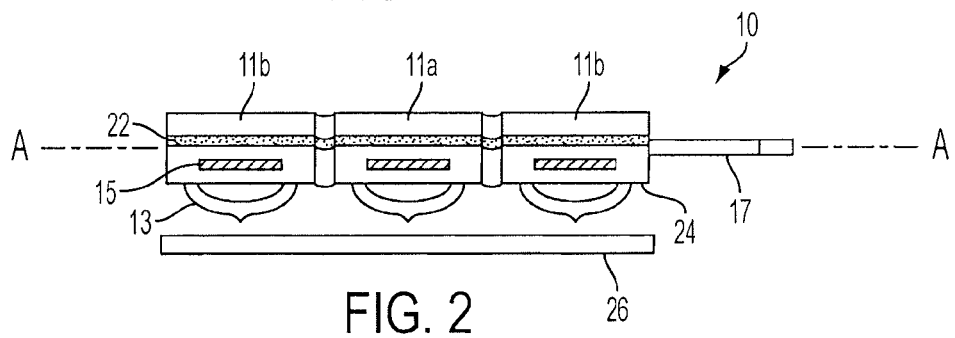
FIG. 2 illustrates a cross sectional view of an exemplary touch sensing device according to various embodiments.

FIG. 2 illustrates a cross sectional view of the exemplary touch sensing device of FIG. 1. In the example of FIG. 2, touch sensing device 10 can include touchable cover 11, having button 11a at the center of the cover and outer portion 11b separate from and surrounding the center button. The touch sensing device 10 can also include flexible circuit 24, having touch sensors 15 embedded therein and force sensors 13 disposed thereon. The flexible circuit 24 can be adhered by adhesive 22 to an undersurface of the touchable cover 11, i.e., a surface opposite the surface to which a touch can occur and a force can be applied. Flexible cable 17 can be connected to the flexible circuit 24 to receive drive signals for the touch sensors 15 and the force sensors 13 and to transmit touch signals from the touch sensors and force signals from the force sensors. The touch sensing device 10 can also include support structure 26 under the flexible circuit 24 for the force sensors 13 to press against when a force is applied to the touchable cover 11, thereby deforming the force sensors to generate a force signal.

Figure 3:
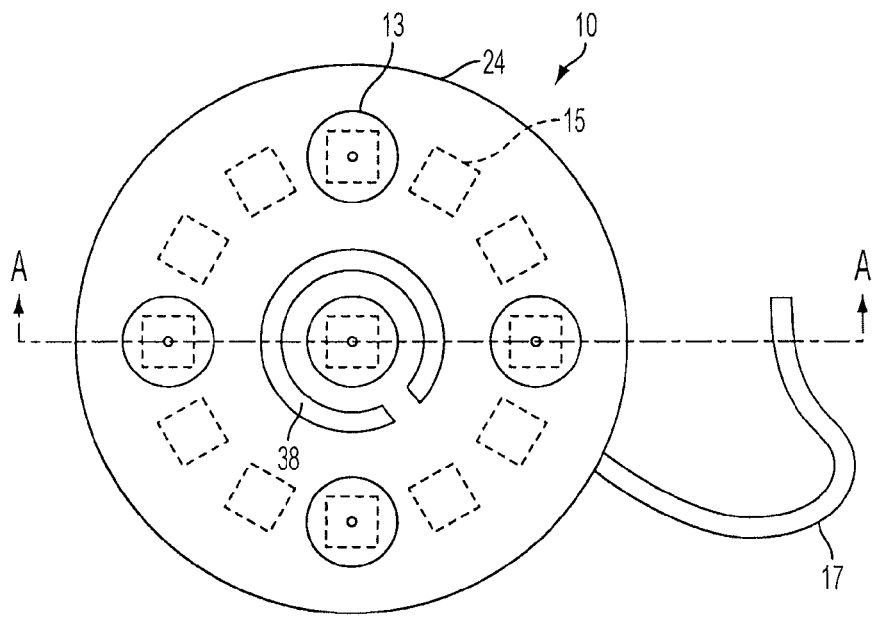
FIG. 3 illustrates a bottom view of an exemplary flexible circuit for a touch sensing device according to various embodiments.

FIG. 3 illustrates a bottom view of the flexible circuit of the exemplary touch sensing device of FIGS. 1 and 2, where the bottom view can be the surface of the flexible circuit opposite the surface adhered to the touchable cover of the touch sensing device. In the example of FIG. 3, touch sensing device 10 can include flexible circuit 24, having touch sensors 15 embedded therein and force sensors 13 disposed thereon. The flexible circuit 24 can also include center cutout 38 configured to allow outer portion 11b of touchable cover 11 to move without moving center button 11a. Flexible cable 17 can be connected to the flexible circuit 24 as described previously.

The configuration of the touch sensing device 10 of FIGS. 1-3 can result in the device being thicker than desired or preferred. This thickness can be due to the amount of space needed between the force sensors 13 and the support structure 26 so that the touchable cover 11 can have room to move and the force sensors can have space between them and the support structure to be in an undeformed state when no force is applied to the cover, e.g., when the cover rotates or when the cover incidentally wobbles. This thickness can also be due to the amount of space needed for the flexible cable 17 connected to the flexible circuit 24 to have sufficient length to comply with the tilt, translational, and rotational motion of the cover 11. Other factors can also affect the thickness of the touch sensing device. With the trend toward smaller and thinner devices, a thinner touch sensing device may be desirable.

Figure 4:
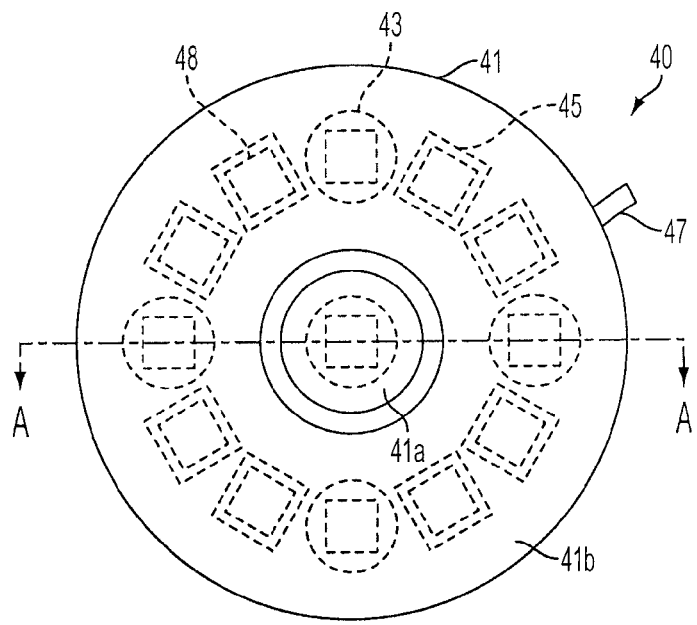
FIG. 4 illustrates a top view of an exemplary touch sensing device according to various embodiments.

FIG. 4 illustrates a top view of an exemplary touch sensing device according to various embodiments, where the touch sensing device can be thinner than that of FIGS. 1-3. In the example of FIG. 4, touch sensing device 40 can include touchable cover 41, which can have button 41a at the center of the cover and outer portion 41b separate from and surrounding the center button. The touchable cover 41 can be configured to receive a touch from an object and/or a force applied by the object at a touchable surface of the cover. The touchable cover 41 can also be configured to cover and protect the underlying device components from dust and damage. An object's touch can be sensed by touch sensors disposed under the touchable cover 41, where the touch sensors can be formed from conductive electrodes 48 coupled with either conductive nodes 45 or force sensors 43. The touch sensors can be disposed under the outer portion 41b, the center button 41a, or both, to sense a touch thereat. An applied force can be sensed by force sensors 43 also disposed under the touchable cover 41. The force sensors 43 can be disposed under the outer portion 41b, the center button 41a, or both, to sense an applied force. The force sensors 43 can be used for both touch sensing and force sensing.

The touch sensing device 40 can also include stub 47, having signal lines (not shown) so that a processor (not shown) or other suitable components can determine force applied to the force sensors and touch at the touch sensors.

In some embodiments, the touch sensors can be capacitance sensors, such that a sensed change in capacitance can indicate a touch at the device 40. A conductive electrode 48 and a force sensor 43 can be in close proximity so as to form mutual capacitance therebetween. Similarly, a conductive electrode 48 and a conductive node 45 can be in close proximity so as to form mutual capacitance therebetween. During operation, the electrodes 48 can be charged and the charge can capacitively couple to the corresponding force sensor 43 or conductive node 45. As an object approaches the touchable cover 41, the object can change the capacitance between the electrodes 48 and the device ground and/or between some of the electrodes and others of the electrodes. This change in capacitance can be detected by electronics connected to the force sensors 43 and the conductive nodes 45, because the total capacitances that the electronics can directly measure can be influenced, for example, by (a) the series capacitance coupling of the force sensors to the electrodes 48 and of the conductive nodes to the electrodes; and (b) the capacitance between some of the electrodes to others of the electrodes and between the electrodes and system ground. These total capacitances can include capacitance from some of the force sensors 43 to others of the force sensors, capacitance from the force sensors to the conductive nodes 45, capacitance from some of the conductive nodes to others of the conductive nodes, capacitance from the force sensors to device ground, and capacitance from the conductive nodes to device ground. The change in capacitance can be measured by the touch sensing device 40 to determine the positions of multiple objects when they touch the touchable cover 41.

In some embodiments, the force sensors 43 can be dome switches, such as described previously.

Figure 5:
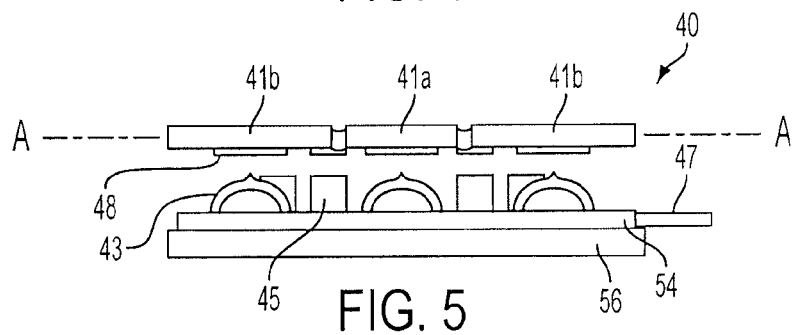
FIG. 5 illustrates a cross sectional view of an exemplary touch sensing device according to various embodiments.

FIG. 5 illustrates a cross sectional view of the exemplary touch sensing device of FIG. 4. In the example of FIG. 5, touch sensing device 40 can include touchable cover 41, having button 41a at the center of the cover and outer portion 41b separate from and surrounding the center button. The touchable cover 41 can also have conductive electrodes 48 disposed on the undersurface of the cover, i.e., a surface opposite the surface at which an object can touch or apply force to the cover. The touch sensing device 40 can also include flexible circuit 54, having force sensors 43 and conductive nodes 45 disposed on a surface of the circuit. The flexible circuit 54 can be disposed on support structure 56. The force sensors 43 and the conductive nodes 45 disposed on the flexible circuit 54 can be coplanar with each other and aligned with corresponding conductive electrodes 48 disposed on the undersurface of the touchable cover 41, thereby capacitively coupling together as described previously. The conductive nodes 45 can be of similar height as the force sensors 43 so that the capacitive distances to their corresponding conductive electrodes 48 can be substantially the same, thereby forming similar capacitances. Stub 47 can be connected to the flexible circuit 54 to receive drive signals for the touch sensors and the force sensors and to transmit touch signals from the touch sensors and force signals from the force sensors.

Similar to the touch sensing device 10 of FIGS. 1-3, the touch sensing device 40 of FIG. 4 can have the center button 41a and the outer portion 41b moving independent of each other and operating either together or separately, depending on the needs of the touch sensing device 40. In some embodiments, the center button 41a can have a spring action, where the button can move below the plane of the touchable cover 41 when force is applied and can move up to the plane of the cover when the force is removed. When force is applied, the button 41a can move down to contact the force sensor 43 and deform the sensor to generate a force signal. In some embodiments, the outer portion 41b can have a tilt action, where the outer portion can tilt at a particular location below the original plane of the touchable cover 41 when force is applied and can move back up to the original plane of the cover when the force is removed. When force is applied, the outer portion 41a at the force location can tilt down to contact the force sensor 43 below and deform the sensor to generate a force signal. In some embodiments, the outer portion 41b can have a rotational motion, where the outer portion can rotate around the center button 41a in either direction when touched. When a touch or a rotational motion occurs, the touch sensors formed by the conductive electrodes 48 and corresponding force sensors 43 and conductive nodes 45 at the locations of the touch or rotational motion can generate touch signals. In some embodiments, the outer portion 41b can have a spring action, similar to the center button 41a, where the outer portion can move below the plane of the touchable cover 41 when force is applied and can move up to the plane of the cover when the force is removed. When force is applied, one or more of the force sensors 43 disposed under the outer portion 41b can deform to generate a force signal and one or more of the touch sensors 45 can sense the location of the applied force and generate a touch signal.

Figure 6:
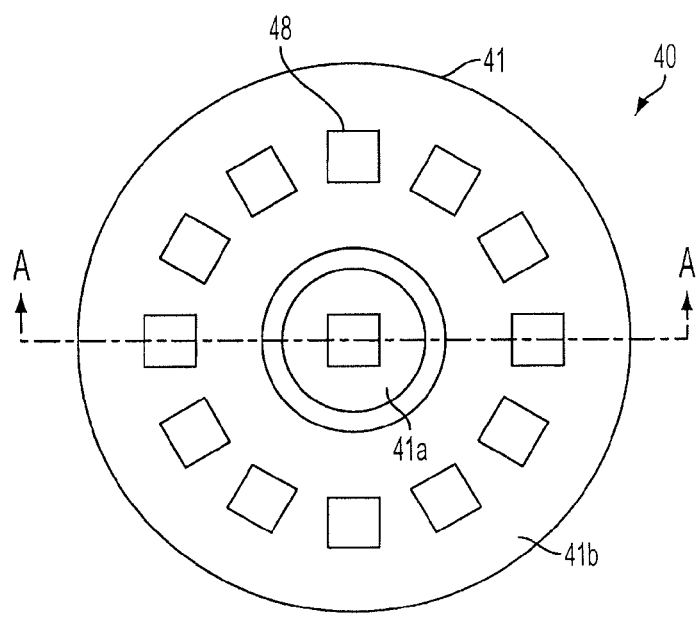
FIG. 6 illustrates a bottom view of an exemplary movable cover of a touch sensing device according to various embodiments.

FIG. 6 illustrates a bottom view of the touchable cover of the exemplary touch sensing device of FIGS. 4 and 5, where the bottom view can be the undersurface of the touchable cover 41. In the example of FIG. 6, touch sensing device 40 can include touchable cover 41, having conductive electrodes 48 disposed thereon. In some embodiments, the conductive electrodes 48 can be printed on the undersurface using a conductive material, such as carbon. Other fabrication techniques and conductive materials can also be used. The electrodes 48 can have any shape and/or configuration capable of providing capacitive sensing according to various embodiments. For example, the electrodes 48 can form zigzag shapes on the undersurface of the cover 11.

Figure 7:
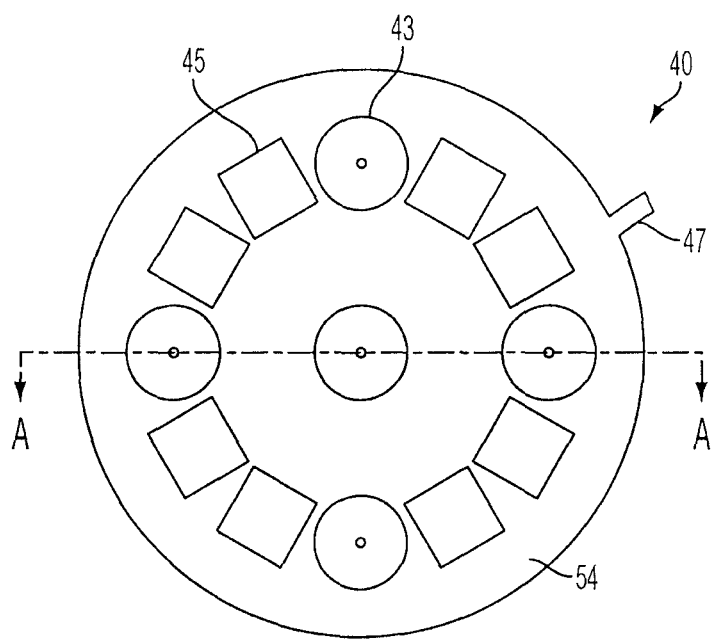
FIG. 7 illustrates a top view of an exemplary flexible circuit for a touch sensing device according to various embodiments.

FIG. 7 illustrates a top view of the flexible circuit of the exemplary touch sensing device of FIGS. 4-6, where the top view can be the surface proximate to the undersurface of the touchable cover 41. In the example of FIG. 7, touch sensing device 40 can include flexible circuit 54, having force sensors 43 and conductive nodes 45 disposed thereon. The force sensors 43 can be deformable so as to sense a force applied to the touchable cover 41. The conductive nodes 45 can be deformable so as to accommodate a tilt or translation of the touchable cover 41 when force is applied. In some embodiments, the conductive nodes 45 can be deformable conductive pads. In some embodiments, the conductive nodes 45 can be conductive springs. Other deformable material can also be used. Stub 47 can be connected to the flexible circuit 54 as described previously.

Some differences in the configuration of the touch sensing device 40 of FIGS. 4-7 from the touch sensing device 10 FIGS. 1-3 can result in the device 40 being thinner. For example, by the flexible circuit 54 being disposed on the support structure 56 rather than on the touchable cover 41, the stub 47 can be used as the transmission medium for the touch and force signals rather than the flexible cable 17 of FIGS. 1-3. As a result, less space can be used to house the shorter stub 47. This can be a result of the flexible circuit 54 being disposed on a stationary structure, i.e., the support structure 56, rather than on a movable structure, i.e., the touchable cover 41, such that the stub 47 need not have extra length to comply with tilt, translation, and/or rotation of the flexible circuit when the cover tilts, translates, and/or rotates. Similarly, by the force sensors 43 being disposed via the flexible circuit 54 on the support structure 56 rather than via the flexible circuit 24 on the touchable cover 11 as in FIGS. 1-3, the space between the force sensors and the structure used to deform them can be reduced because incidental movement of the cover 41 may not apply enough force to the sensors sufficient to deform the sensors.

The center cutout 38 in the flexible circuit 24 of FIGS. 1-3 can optionally be omitted in the flexible circuit 54 of FIGS. 4-7 since the flexible circuit 54 need not accommodate both movement of the outer portion 41b of the touchable cover 41 and non-movement of the center button 41a.

To provide effective touch sensing, the touch sensors of FIGS. 4-7 can be different from those of FIGS. 1-3. For example, disposing the flexible circuit 24 away from the touchable cover 11 could mean that embedded touch sensors 15 would also be disposed away from the cover, thereby increasing the distance from an object's touch and decreasing the ability of the sensors to sense capacitance changes caused by the touch. As a result, as in FIGS. 4-7, disposing portions of the touch sensors in the form of conductive electrodes 48 on the undersurface of the cover 11, while capacitively coupling them with the force sensors 43, can provide components close enough to an object's touch on the cover to effectively sense the touch. However, since the force sensors 43 may not be disposed at all the locations that the object may touch, additional elements to capacitively couple with the conductive electrodes 48 can be used in the form of the conductive nodes 45 at the non-force sensor locations.

In some embodiments, rather than having separate center button and outer portion, the touchable cover 41 can be a single structure, having a deformable region in the center of the cover to act as the center button 41a and a rigid region surrounding the center button to act as the outer portion 41b. In some embodiments, the entire touchable cover 41 can be a single deformable structure, where the cover can deform to contact a force sensor, rather than tilting and/or translating.

Figure 8:
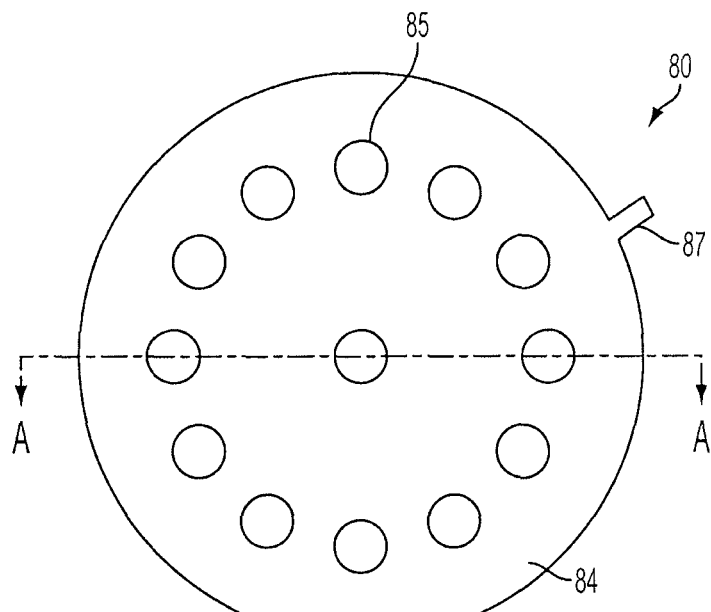
FIG. 8 illustrates a top view of another exemplary flexible circuit for a touch sensing device according to various embodiments.

FIG. 8 illustrates a top view of another flexible circuit of an exemplary touch sensing device according to various embodiments. Flexible circuit 84 of FIG. 8 can be similar to the flexible circuit 54 of FIG. 7 with some differences. The flexible circuit 84 of FIG. 8 can include conductive nodes 85 disposed thereon, rather than both nodes and force sensors as in FIG. 7. The conductive nodes 85 can capacitively couple with corresponding conductive electrodes disposed on the undersurface of a touchable cover of the touch sensing device to form touch sensors. The conductive nodes 85 can be of a height sufficient to capacitively couple with the conductive electrodes to provide touch sensing capabilities. In some embodiments, the conductive nodes 85 can be rigid below a stationary touchable cover to sense touch and/or gestures, e.g., rotational motion, at the touchable cover of the touch sensing device. In some embodiments, the conductive nodes 85 can be deformable below a movable touchable cover to sense touch and/or gestures and to sense applied force based on a change in capacitance due to the change in distance between the conductive nodes and the touchable cover.

Figure 9:
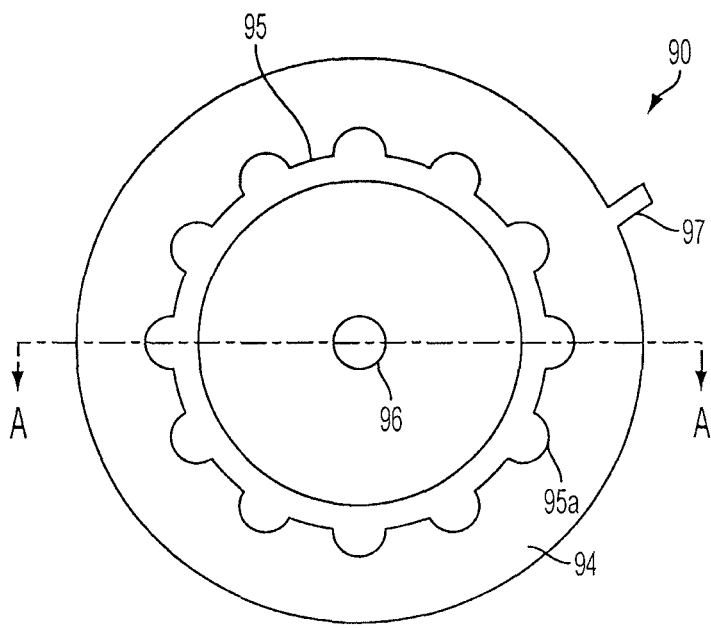
FIG. 9 illustrates a top view of still another exemplary flexible circuit for a touch sensing device according to various embodiments.

FIG. 9 illustrates a top view of still another flexible circuit of an exemplary touch sensing device according to various embodiments. Flexible circuit 94 of FIG. 9 can be similar to the flexible circuit 54 of FIG. 7 with some differences. The flexible circuit 94 of FIG. 9 can include conductive ring 95 disposed thereon, rather than individual nodes and force sensors as in FIG. 7. The flexible circuit 94 can also include conductive node 96 at the center of the flexible circuit to align with a center button of the touch sensing device. The conductive ring 95 can have extensions 95a to align with corresponding conductive electrodes disposed on the undersurface of a touchable cover of the touch sensing device to form touch sensors. The conductive extensions 95a can be of a height sufficient to capacitively couple with the conductive electrodes to provide touch sensing capabilities. In some embodiments, to ensure that the conductive extensions 95a can not substantially interfere with each other via the conductive ring 95, the ring can include high dielectric material around the ring, excluding the locations of the extensions. In some embodiments, the conductive extensions 95a can be rigid below a stationary touchable cover to sense touch and/or gestures, e.g., rotational motion, at the touchable cover of the touch sensing device. In some embodiments, the conductive extensions 95a can be deformable below a movable touchable cover to sense touch and/or gestures and to sense applied force based on a change in capacitance due to the change in distance between the conductive extensions and the touchable cover.

It is to be understood that other configurations of the underlying conductive nodes can also be used.

Figure 10:
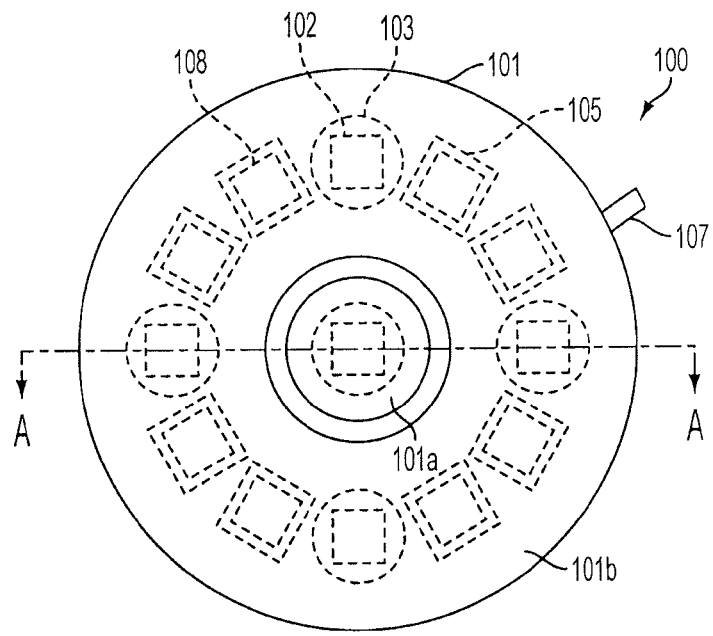
FIG. 10 illustrates a top view of an exemplary touch sensing device according to various embodiments.

FIG. 10 illustrates a top view of another exemplary touch sensing device according to various embodiments, where the touch sensing device can be thinner than that of FIGS. 1-3. In the example of FIG. 10, touch sensing device 100 can include touchable cover 101, which can have button 101a at the center of the cover and outer portion 101b separate from and surrounding the center button. The touchable cover 101 can be configured to receive a touch from an object and/or a force applied by the object on a touchable surface of the cover. The touchable cover 101 can also be configured to cover and protect the underlying device components from dust and damage. An object's touch can be sensed by touch sensors disposed under the touchable cover 101, where the touch sensors can be formed from conductive electrodes 102 coupled with force sensors 103 and conductive electrodes 108 coupled with conductive nodes 105. The touch sensors can be disposed under the outer portion 101b, the center button 101a, or both, to sense a touch thereat. An applied force can be sensed by force sensors 103 also disposed under the touchable cover 101. The force sensors 103 can be disposed under the outer portion 101b, the center button 101a, or both, to sense an applied force. The force sensors 103 can be used for both touch sensing and force sensing.

The touch sensing device 100 can also include stub 107, having signal lines (not shown) so that a processor (not shown) or other suitable components can determine force applied to the force sensors and touch at the touch sensors.

In some embodiments, the touch sensors can be capacitance sensors, as described previously, where the capacitance sensors can be formed by conductive electrodes 102 coupled with corresponding force sensors 103 and conductive electrodes 108 coupled with corresponding conductive nodes 105. In some embodiments, the force sensors 103 can be dome switches, such as described previously.

Figure 11:
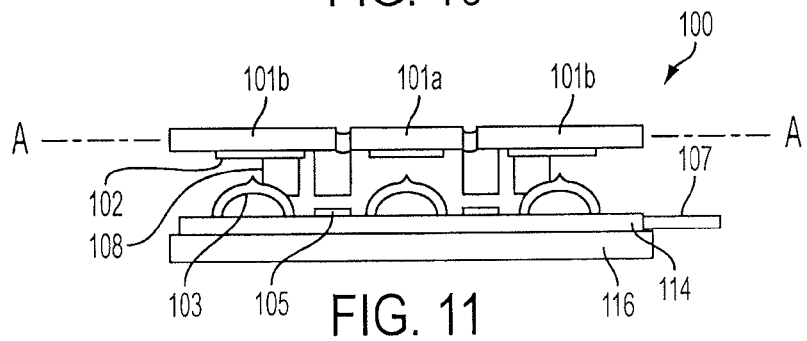
FIG. 11 illustrates a cross sectional view of an exemplary touch sensing device according to various embodiments.

FIG. 11 illustrates a cross sectional view of the exemplary touch sensing device of FIG. 10. In the example of FIG. 11, touch sensing device 100 can include touchable cover 101, having button 101a at the center of the cover and outer portion 101b separate from and surrounding the center button. The touchable cover 101 can also have conductive electrodes 102 and 108 disposed on the undersurface of the cover, i.e., a surface opposite the surface at which an object can touch or apply force to the cover. The touch sensing device 100 can also include flexible circuit 114, having force sensors 103 and conductive nodes 105 disposed on a surface of the circuit. The flexible circuit 114 can be disposed on support structure 116. The force sensors 103 disposed on the flexible circuit 114 can be aligned with corresponding conductive electrodes 102 disposed on the undersurface of the touchable cover 101 and the conductive nodes 105 disposed on the flexible circuit can be aligned with corresponding conductive electrodes 108 disposed on the undersurface of the touchable cover, thereby capacitively coupling together as described previously. The conductive electrodes 108 can be of similar height as the force sensors 103 so that the capacitive distances between the conductive electrodes 108 and their corresponding conductive nodes 105 can be similar to the capacitive distances between the conductive electrodes 102 and their corresponding force sensors 103, thereby forming similar capacitances. Stub 107 can be connected to the flexible circuit 114 to receive drive signals for the touch sensors and the force sensors and to transmit touch signals from the touch sensors and force signals from the force sensors.

Similar to the touch sensing device 40 of FIGS. 4-7, the touch sensing device 100 of FIGS. 10 and 11 can have the center button 101a and the outer portion 101b moving independent of each other and operating either together or separately, depending on the needs of the touch sensing device 100.

Figure 12:
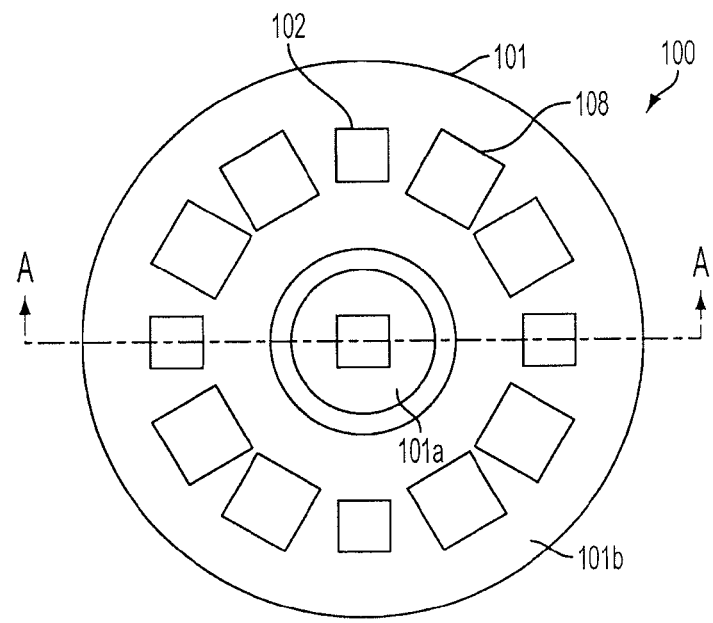
FIG. 12 illustrates a bottom view of an exemplary movable cover of a touch sensing device according to various embodiments

FIG. 12 illustrates a bottom view of the touchable cover of the exemplary touch sensing device of FIGS. 10 and 11, where the bottom view can be the undersurface of the touchable cover 101. In the example of FIG. 12, touch sensing device 100 can include touchable cover 101, having conductive electrodes 102 and 108 disposed thereon, where the conductive electrodes 108 can extend farther from the undersurface of the cover than the conductive electrodes 102. In some embodiments, the conductive electrodes 102 and 108 can be printed on the undersurface using a conductive material, such as carbon. Other fabrication techniques and conductive materials can also be used. The electrodes 102 and 108 can have any shape and/or configuration capable of providing capacitive sensing according to various embodiments. For example, the electrodes 102 and 108 can form zigzag shapes on the undersurface of the cover 101. In some embodiments, the conductive electrodes 108 can be deformable so as to accommodate a tilt or translation of the touchable cover 101 when force is applied.

Figure 13:
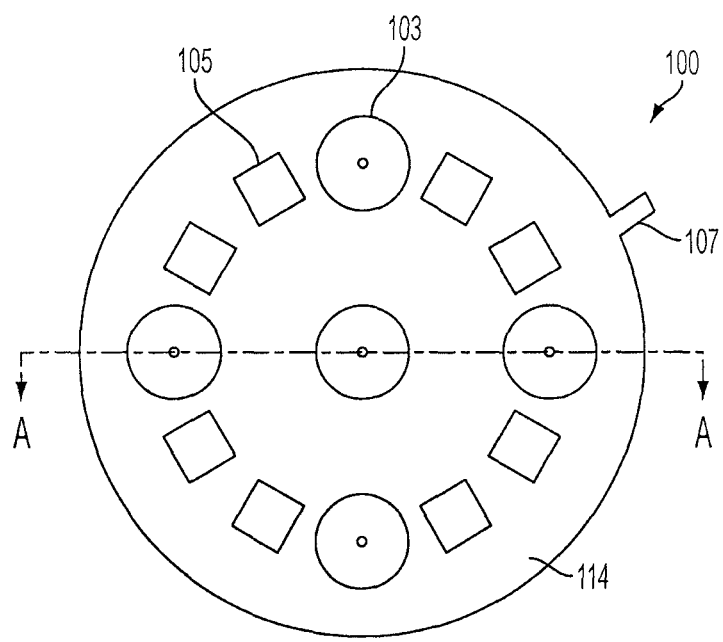
FIG. 13 illustrates a top view of an exemplary flexible circuit for a touch sensing device according to various embodiments.

FIG. 13 illustrates a top view of the flexible circuit of the exemplary touch sensing device of FIGS. 10-12, where the top view can be the surface adjacent to the undersurface of the touchable cover 101. In the example of FIG. 13, touch sensing device 100 can include flexible circuit 114, having force sensors 103 and conductive nodes 105 disposed thereon. The force sensors 103 can be deformable so as to sense a force applied to the touchable cover 101. The conductive nodes 105 can be deformable so as to accommodate a tilt or translation of the touchable cover 101 when force is applied. In some embodiments, the conductive nodes 105 can be deformable conductive pads. In some embodiments, the conductive nodes 105 can be conductive springs. Other deformable material can also be used. Stub 107 can be connected to the flexible circuit 114 as described previously.

Figure 14:
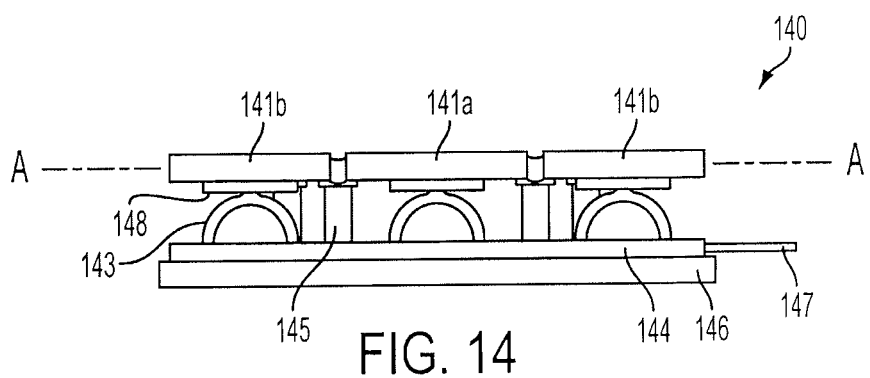
FIG. 14 illustrates a cross sectional view of an exemplary touch sensing device according to various embodiments

FIG. 14 illustrates a cross sectional view of an exemplary touch sensing device according to various embodiments. In the example of FIG. 14, touchable cover 141 via conductive electrodes 148 can have electrical contact with corresponding force sensors 143 and conductive nodes 145 at all times. This can ensure consistent capacitive touch sensing at various positions at the cover 141 because all the electrodes 148 and their corresponding sensors and nodes can have similar capacitances due to all of them having similar consistent contact with the cover.

Figure 15:
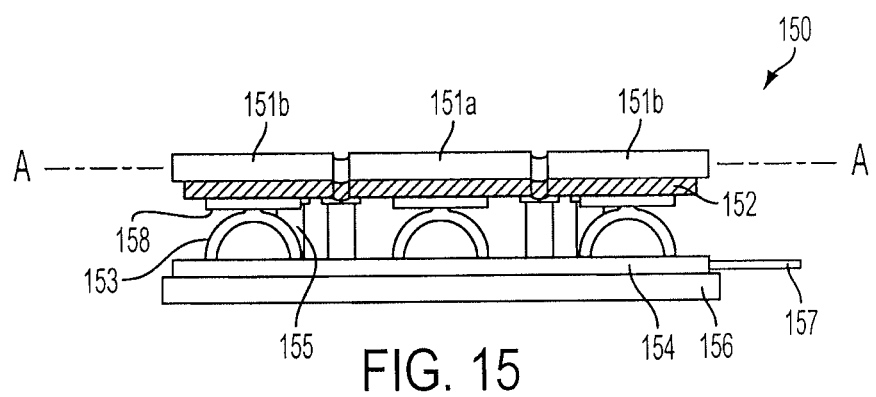
FIG. 15 illustrates a cross sectional view of another exemplary touch sensing device according to various embodiments.

FIG. 15 illustrates a cross sectional view of another exemplary touch sensing device according to various embodiments. In the example of FIG. 15, touchable cover 151 can be absent electrical contact with corresponding force sensors 153 and conductive nodes 155 at all times. Rather, insulating layer 152 can be disposed between the undersurface of the cover 151 and conductive electrodes 158 to minimize, isolate, or attenuate contact. This also can ensure consistent capacitive touch sensing at various positions at the cover 151 because all the electrodes 158 and their corresponding sensors and nodes can have similar capacitances due to all of them having similar consistent non-contact with the cover.

Figure 16:
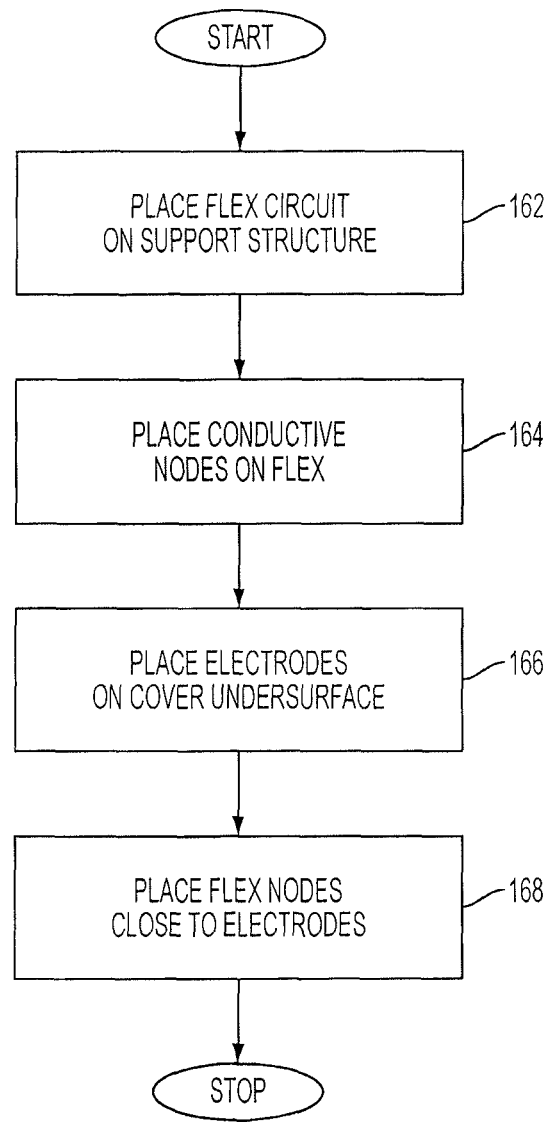
FIG. 16 illustrates an exemplary method for forming a touch sensing device according to various embodiments.

FIG. 16 illustrates an exemplary method for forming an exemplary touch sensing device according to various embodiments. In the example of FIG. 16, a flexible circuit can be placed on a support structure of the touch sensing device (162). The support structure can be stationary and the flexible circuit can be made stationary when placed on the structure. Conductive nodes can be placed on the flexible circuit at various locations, in various poses, configurations, and layouts, in various orientations, etc., according to the needs of the device (164). In some embodiments, the conductive nodes can include a combination of force sensors and touch sensors for devices having force and touch sensing capabilities. In some embodiments, the conductive nodes can include touch sensors for devices having touch sensing capabilities. Other types of nodes can also be used, depending on the needs of the device. Conductive electrodes can be printed on the undersurface of the touchable cover of the touch sensing device in locations corresponding to the locations of the conductive nodes on the flexible circuit (166). In addition to or alternatively, the electrodes can be plated, cast, laid, or otherwise disposed on the cover undersurface. The cover and the flexible circuit can be placed close together so that the conductive electrodes on the cover undersurface and the conductive nodes on the flexible circuit can be aligned facing each other in close proximity (168). This can result in a thinner touch sensing device with the touch sensing capabilities of a thicker device having force and/or touch sensors on the touchable cover undersurface.

Other and/or additional methods can also be used to form a touch sensing device according to various embodiments.

In some embodiments, the touch sensing device as described previously can be a click wheel, which can be used in a digital media player. In some embodiments, the touch sensing device as described previously can be a touch pad, which can be used in a mobile telephone, a personal computer, and the like.

Figure 17:
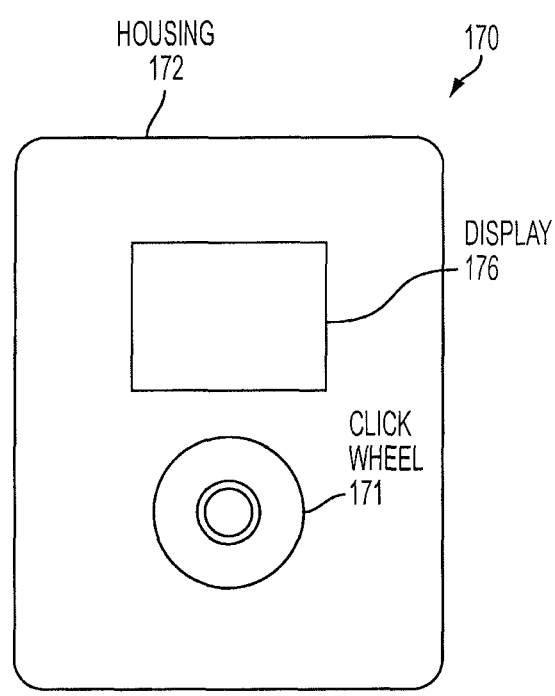
FIG. 17 illustrates an exemplary digital media player according to various embodiments.

FIG. 17 illustrates an exemplary digital media player having a click wheel as a touch sensing device according to various embodiments. In the example of FIG. 17, digital medial player 170 can include housing 172 for enclosing various electrical components of the player, display 176 for displaying a graphical user interface as well as information for a user, and click wheel 171 for providing touch and force input by the user to the player. By way of example, the media player 170 can correspond to any of those iPod™ music players manufactured by Apple Computer of Cupertino, Calif. (e.g., standard, mini, iShuffle™, Nano™, etc.).

The housing 172 can enclose internally various electrical components (including integrated circuit chips and other circuitry) to provide computing operations for the media player 170. The integrated circuit chips and other circuitry can include a microprocessor, memory (e.g., ROM, RAM), a power supply (e.g., battery), a circuit board, a hard drive, and various input/output (I/O) support circuitry. In the case of music players, the electrical components can include components for outputting music such as an amplifier and a digital signal processor (DSP). In the case of video recorders or cameras the electrical components can include components for capturing images such as image sensors (e.g., charge coupled device (CCD) or complimentary oxide semiconductor (CMOS)) or optics (e.g., lenses, splitters, filters). In addition to the above, the housing can also define the shape or form of the media player. That is, the contour of the housing 172 can embody the outward physical appearance of the media player 170.

The display 176 can be used to display a graphical user interface as well as other information to the user (e.g., text, objects, or graphics). The display 176 can be a liquid crystal display (LCD), for example. As shown, the display 176 can be visible to a user of the media player 170 through an opening in the housing 172. The opening can include a transparent wall (not shown) that can be disposed in front of the display 172 to protect the display from damage and dust.

The click wheel 171 can be a touch sensing device according to various embodiments. The click wheel 171 can be configured to provide one or more control functions for controlling various applications associated with the media player 170. For example, a touch and/or force initiated control function can be used to move an object or perform an action on the display 176 or to make selections or issue commands associated with operating the media player 170. The manner in which the click wheel 171 receives input can vary. For example, the click wheel 171 can receive input from a finger tap, a finger press, a finger rotational motion, a finger linear motion, and so on. In some embodiments, a finger rotational motion at the click wheel 171 can cause a scrolling motion on the display 176, e.g., through a menu of displayed items. In some embodiments, a finger press at the click wheel 171 can cause a selection on the display 176, e.g., selection of a cursor identified or highlighted item being displayed. In addition to or alternatively, a finger press at the click wheel 171 can cause execution of an application associated with the media player 170.

Figure 18:
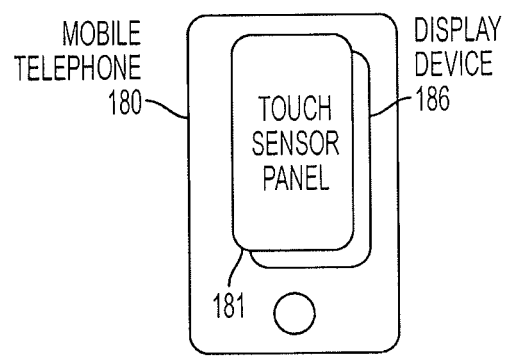
FIG. 18 illustrates an exemplary mobile telephone according to various embodiments.

FIG. 18 illustrates an exemplary mobile telephone 180 that can include touch sensor panel 181 as a touch sensing device, display 186, and other computing system blocks according to various embodiments.

Figure 19:
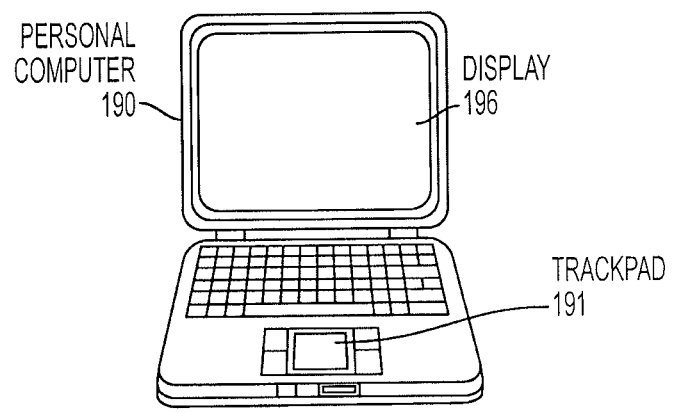
FIG. 19 illustrates an exemplary personal computer according to various embodiments.

FIG. 19 illustrates an exemplary personal computer 190 that can include touch sensor panel (trackpad) 191 as a touch sensing device, display 196, and other computing system blocks according to various embodiments.

The digital media player, mobile telephone, and personal computer of FIGS. 17-19 can realize space savings, power savings, and improved performance according to various embodiments.

Although various embodiments herein describe the touch sensing device as being circular, it is to be understood that the device can have other shapes, e.g., oval, rectangular, triangular, irregular, etc. It is further to be understood that the touch sensing device is not limited to the substantially flat structure described herein, but can include curved, sloped, etc., structures.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A touch sensing device comprising:
    a first structure having a touchable surface and an opposite surface;
    multiple conductive electrodes associated with the opposite surface of the first structure;
    a second structure having a surface;
    multiple force sensors associated with the surface of the second structure and
    multiple conductive nodes distinct from the multiple force sensors and associated with the surface of the second structure,
    the opposite surface of the first structure and the surface of the second structure being proximate to each other, and the conductive electrodes and the conductive nodes configured to form capacitive elements between the opposite surface of the first structure and the surface of the second structure to sense a touch at the touchable surface, the force sensors and the conductive nodes being coplanar with each other and being cofacially centered with the conductive electrodes.

2. The device of claim 1, wherein the conductive electrodes and the conductive nodes capacitively couple with each other to form the capacitive elements.

3. The device of claim 1, wherein the conductive nodes are configured to extend away from the surface of the second structure to be proximate to the conductive electrodes.

4. The device of claim 1, comprising a conductive ring, wherein the conductive nodes form extensions from the conductive ring.

5. The device of claim 4, wherein the conductive ring comprises high dielectric material and the conductive nodes comprise conductive material.

6. The device of claim 1, wherein the conductive nodes are deformable.

7. The device of claim 1 incorporated into at least one of a digital media player, a mobile telephone, or a personal computer.

8. A touch sensing device comprising:
    a first element comprising multiple conductive touch sensitive electrodes;
    a second element comprising multiple conductive force sensitive switches, the switches associated with a first group of the electrodes; and
    the second element comprising multiple conductive nodes, the nodes associated with a second group of the electrodes,
    the switches and the nodes being coplanar with each other and being cofacially centered with the electrodes.

9. The device of claim 8, wherein the switches are dome switches.

10. The device of claim 8, wherein the switches are deformable in order to sense a force applied to the device.

11. The device of claim 8, wherein the switches and the first group of the electrodes form capacitive sensors to sense a touch at the device.

12. The device of claim 8, wherein the nodes and the second group of the electrodes form capacitive sensors to sense a touch at the device.

13. The device of claim 8, wherein the switches and the nodes are of equal length and form similar capacitive coupling with the electrodes.

14. The device of claim 8, wherein the switches and the second group of the electrodes are of equal length and provide similar capacitive coupling between the switches and the first group of the electrodes and between the second group of the electrodes and the nodes.

15. A touch sensing device comprising:
    a cover configured to move in response to a force applied to the cover and to receive a touch at the cover, the cover comprising at least one conductive electrode; and
    a flexible circuit proximate to the cover, the flexible circuit configured to sense a force applied to the cover and a touch received at the cover, the flexible circuit comprising at least one conductive force sensitive switch and at least one conductive node proximate to the conductive electrode,
    the conductive electrode and the conductive node disposed between the cover and the flexible circuit,
    the conductive force sensitive switch and the at least one conductive node being coplanar with each other and being cofacially centered with the conductive electrode.

16. The device of claim 15, wherein the cover comprises: a center button; and an outer portion surrounding the center button.

17. The device of claim 16, wherein the center button is configured to move in response to the applied force so that a function associated with the device executes.

18. The device of claim 16, wherein the outer portion is configured to move in response to the applied force so that a function associated with the device executes.

19. The device of claim 15, wherein the flexible circuit is configured to be stationary.

20. The device of claim 15, wherein the cover and the flexible circuit are in electrical contact during operation.

21. The device of claim 15, comprising an insulating layer between the cover and the at least one conductive electrode, wherein the cover and the flexible circuit are electrically isolated from each other during operation.

22. A click wheel comprising:
    a movable cover having a touchable surface and an opposite surface with multiple conductive electrodes associated with the opposite surface; and
    a flexible circuit having a surface with multiple deformable conductive nodes and multiple conductive switches associated with the surface,
    the conductive electrodes configured to align with the deformable conductive nodes and the conductive switches to form capacitive sensors for sensing a touch at the touchable surface, and
    the conductive switches configured to form force sensors for sensing a force applied to the touchable surface,
    the conductive switches and the conductive nodes being coplanar with each other and being cofacially centered with the conductive electrodes.

23. A method comprising:
    providing a device having a movable structure and a stationary structure;
    providing a flexible circuit on the stationary structure;
    disposing multiple deformable conductive nodes on the flexible circuit;
    disposing multiple conductive switches on the flexible circuit;
    disposing multiple conductive electrodes on the movable structure; and positioning the deformable conductive nodes on the flexible circuit close to the conductive electrodes on the movable structure so that the provided device is thin, positioning the conductive switches and the conductive nodes to be coplanar with each other and cofacially centered with the conductive electrodes.

\* \* \* \* \*